(12) United States Patent
Nagaraja

(10) Patent No.: US 10,878,314 B2
(45) Date of Patent: *Dec. 29, 2020

(54) SYSTEM AND METHOD FOR TRAINING ARTIFICIAL INTELLIGENCE SYSTEMS USING A SIMA BASED PROCESSOR

(71) Applicant: ALPHAICS CORPORATION, Wilmington, DE (US)

(72) Inventor: Nagendra Nagaraja, Bangalore (IN)

(73) Assignee: ALPHAICS CORPORATION

( * ) Notice: Subject to any disclaimer, the term of this patent is extended or adjusted under 35 U.S.C. 154(b) by 748 days.

This patent is subject to a terminal disclaimer.

(21) Appl. No.: 15/659,501

(22) Filed: Jul. 25, 2017

(65) Prior Publication Data

US 2018/0260691 A1    Sep. 13, 2018

Related U.S. Application Data

(63) Continuation-in-part of application No. 15/455,126, filed on Mar. 9, 2017, now Pat. No. 9,754,221.

(51) Int. Cl.
| | |
|---|---|
| *G06N 3/04* | (2006.01) |
| *G06N 3/063* | (2006.01) |
| *G06F 9/46* | (2006.01) |
| *G06N 3/00* | (2006.01) |
| *G06N 3/08* | (2006.01) |
| *G06N 7/00* | (2006.01) |

(52) U.S. Cl.
CPC ............... *G06N 3/063* (2013.01); *G06F 9/46* (2013.01); *G06N 3/006* (2013.01); *G06N 3/0454* (2013.01); *G06N 3/08* (2013.01); *G06N 7/005* (2013.01)

(58) Field of Classification Search
CPC ...................................................... G06N 20/00
USPC ..................................................... 706/15, 45
See application file for complete search history.

(56) References Cited

U.S. PATENT DOCUMENTS 9,754,221 B1 *   9/2017   Nagaraja .............. G06N 3/0454

* cited by examiner

*Primary Examiner* — David R Vincent
(74) *Attorney, Agent, or Firm* — Barry Choobin; Patent 360 LLC

(57) ABSTRACT

A reinforcement learning processor specifically configured to train reinforcement learning agents in the AI systems by the way of implementing an application-specific instruction set is disclosed. The application-specific instruction set incorporates 'Single Instruction Multiple Agents (SIMA)' instructions. SIMA type instructions are specifically designed to be implemented simultaneously on a plurality of reinforcement learning agents which interact with corresponding reinforcement learning environments. The SIMA type instructions are specifically configured to receive either a reinforcement learning agent ID or a reinforcement learning environment ID as the operand. The reinforcement learning processor is designed for parallelism in reinforcement learning operations. The reinforcement learning processor executing of a plurality of threads associated with an operation or task in parallel.

16 Claims, 17 Drawing Sheets

| Fetch/Decode unit 14A | | Dispatch/Collect Unit 14B | | Fetch/Decode unit 14A | | Dispatch/Collect Unit 14B | |
|---|---|---|---|---|---|---|---|
| ALU | ALU | ALU | ALU | ALU | ALU | ALU | ALU |
| Learning/ Inferencing Context | | Learning/ Inferencing Context | | Learning/ Inferencing Context | | Learning/ Inferencing Context | |
| Learning/ Inferencing Context | | Learning/ Inferencing Context | | Learning/ Inferencing Context | | Learning/ Inferencing Context | |

FIG. 1B  ~140A

| Core ID | Context ID | Thread ID |
|---|---|---|

FIG. 1C

| EnvID | AgentID | CoreID | ContextID | ThreadID |
|---|---|---|---|---|

FIG. 1D

SYSTEM AND METHOD FOR TRAINING ARTIFICIAL INTELLIGENCE SYSTEMS USING A SIMA BASED PROCESSOR

CROSS-REFERENCE TO RELATED APPLICATION

This application is a continuation-in-part which claims priority from U.S. patent application Ser. No. 15/455,126, filed on Mar. 9, 2017, entitled "PROCESSOR FOR IMPLEMENTING REINFORCEMENT LEARNING OPERATIONS".

BACKGROUND

Technical Field

The present disclosure relates to the field of reinforcement learning. Particularly, the present disclosure relates to a processor specifically programmed for training Artificial Intelligence systems, and to an application-domain specific instruction set (ASI) comprising instructions specifically designed for training reinforcement learning agents.

Description of the Related Art

Artificial Intelligence (AI) aims to make a computer/computer-controlled robot/computer implemented software program mimic the thought process of a human brain. Artificial Intelligence is utilized in various computer implemented applications including gaming, natural language processing, creation and implementation of expert systems, creation and implementation of vision systems, speech recognition, handwriting recognition, and robotics. A computer/computer controlled robot/computer implemented software program achieves or implements Artificial Intelligence through iterative learning, reasoning, perception, problem-solving and linguistic intelligence.

Machine learning is a branch of artificial intelligence that provides computers the ability to learn without necessitating explicit functional programming. Machine learning, emphasizes on the development of (artificially intelligent) learning agents that could tweak their actions and states dynamically and appropriately when exposed to a new set of data. Reinforcement learning is a type of machine learning where a reinforcement learning agent learns by utilizing the feedback received from a surrounding environment in each entered state. The reinforcement learning agent traverses from one state to another by the way of performing an appropriate action at every state, thereby receiving an observation/feedback and a reward from the environment. The objective of a Reinforcement Learning (RL) system is to maximize the reinforcement learning agent's total rewards in an unknown environment through a learning process that warrants the reinforcement learning agent to traverse between multiple states while receiving feedback and reward at every state, in response to an action performed at every state.

Further, essential elements of a reinforcement learning system include a 'policy', 'reward functions', action-value functions' and 'state-value functions'. Typically, a 'policy' is defined as a framework for interaction between the reinforcement learning agent and a corresponding reinforcement learning environment. Typically, the actions undertaken by the reinforcement learning agent and the states traversed by the reinforcement learning agent during an interaction with a reinforcement learning environment are governed by the policy. When an action is undertaken, the reinforcement learning agent moves within the environment from one state to another and the quality of a state-action combination defines an action-value function. The action-value function ($Q_s$) determines expected utility of a (selected) action. The reward function is representative of the rewards received by the reinforcement learning agent at every state in response to performing a predetermined action. Even though rewards are provided directly by the environment after the reinforcement learning agent performs specific actions, the 'rewards' are estimated and re-estimated (approximated/forecasted) from the sequences of observations a reinforcement learning agent makes over its entire lifetime. Thus, a reinforcement learning, algorithm aims to estimate state-value function and an action-value function that helps approximate/forecast the maximum possible reward to the reinforcement learning agent.

Q-learning is one of the techniques employed to perform reinforcement learning. In Q-learning, the reinforcement learning agent attempts to learn an optimal policy based on the historic information corresponding to the interaction between the reinforcement learning agent and reinforcement learning environment. The reinforcement learning agent learns to carry out actions in the reinforcement learning environment to maximize the rewards achieved or to minimize the costs incurred. Q-learning estimates the action-value function that further provides the expected utility of performing a given action in a given state and following the optimal policy thereafter. Thus, by finding the optimal policy, the agents can perform actions to achieve maximum rewards.

Existing methods disclose the use of neural networks (by the reinforcement learning agents) to determine the action to be performed in response to the observation/feedback. Neural networks are machine learning models that employ one or more layers of nonlinear tints to predict an output for a received input. Each layer of the network generates an output from a received input in accordance with current values of a respective set of parameters. However, existing methods do not disclose processor architectures specifically configured to perform reinforcement learning operations. Furthermore, existing methods that promote the use of neural networks do not support reward function approximation.

To implement the function of deep reinforcement learning, and AI application, existing systems typically use GPUs. GPUs typically incorporate Single Instruction Multiple Data (SIMD) architecture to execute reinforcement learning operations. In SIMD, all the GPUs share the same instruction but perform operations on different data elements. However, the GPUs require a large amount of processing time to extract actionable data. Further, GPUs are unsuitable for sequential decision-making tasks and are hindered by a lack of efficiency as far as processing the memory access of reinforcement learning tasks is concerned.

Further, the existing systems do not provide parallelism for reinforcement learning operations. Typically, it consumes about fifteen days to train a full RL agent on the GPU. Reinforcement learning inherently controls data distribution, unlike deep learning, where data must be fed into network. However, the Processors such as GPUs and CPUs incur huge hierarchical overhead of memories. This is because GPUs and CPUs have memory hierarchy in terms of Cache and main memory. Also, the power consumed in such training process is very high and enormous. Each machine consumes more than 600 W of power. Hence, many such GPUs or CPUs are required to perform a distributed training process. However, it is required to reduce the training time by a processor architecture with multi agents and distributed training.

Therefore, in order to overcome the drawbacks discussed hitherto, there is a need for a processor architecture specifically designed for implementing reinforcement learning operations/tasks. Further, there is a need for a processor architecture that renders rich actionable data for effective and efficient implementation of reinforcement learning operations. Yet further, there is a need for a processor architecture that incorporates an application-domain specific instruction set, a memory architecture and a multi-core processor specifically designed for performing reinforcement learning tasks/operations. Furthermore, there is a need for a processor architecture that incorporates SIMA instruction set with multiple agents for distributed training. Still there is a need for a massive parallelism for reinforcement learning while training the reinforcement learning using SIMA based processor (RAP processor).

The abovementioned shortcomings, disadvantages and problems are addressed herein, which will be understood by reading and studying the following specification.

Objects

A primary object of the present disclosure is to provide a processor architecture that enables extraction and collection of rich actionable data best suited for reinforcement learning operations.

Another object of the present disclosure is to provide a processor architecture (processor) that is tailor made for effective and efficient implementation of reinforcement learning tasks/operations.

Yet another object of the present disclosure is to provide a processor architecture incorporating instruction set based on Single Instruction Multiple Agents (SIMA) which is specifically designed for executing tasks/operations pertinent to reinforcement learning in parallel.

Yet another object of the present disclosure is to provide an application domain specific instruction set that is simultaneously executed across multiple reinforcement learning agents and reinforcement learning environments (Single Instruction Multiple Agents (SIMA)).

Yet another object of the present disclosure is to provide a processor architecture designed for parallelism in reinforcement learning operations.

Yet another object of the present disclosure is to provide a processor architecture designed to reduce training times by a processor architecture with multi agents and distributed training Yet another object of the present disclosure is to provide an application domain specific instruction set and a processor architecture optimized for training the reinforcement learning agents.

Yet another object of the present disclosure is to provide SIMA (Single Instruction Multiple Agents) ISA based processor, in which operand is an environment ID or an agent ID, and the operand is scalar or vector.

Yet another object of the present disclosure is to provide autonomous system and server based applications, in which the multiple agents are given as operand to the SIMA instructions, for speeding up training in the applications like gaming.

Yet another object of the present disclosure is to provide a training system for AI systems using SIMA (Single Instruction Multiple Agents) ISA based processor, to support both the reply memory and as well as parallel actor-critic agents, thereby supporting a number of on policy learning methods.

Yet another object of the present disclosure is to provide a training system for AI systems using SIMA (Single Instruction Multiple Agents) based processor, to provide a series of instructions from the host processor to multi-core, multi-threaded RLP.

Yet another object of the present disclosure is to provide a training system for AI systems to provide each agent with different r, v, q, g and a threads, thereby providing separate thread for each one of reinforcement learning operations, to effectively pipeline a number of parallel agents, to decrease training time by order of magnitude compared to Advantage Actor Critic (A3C) algorithm where entire agent is mapped to a single thread.

Yet another object of the present disclosure is to provide a training system for AI systems to enable multiple agents to explore different part of the environment thereby using lesser resource than single DQN, and reducing communication overhead.

Yet another of the present disclosure is to provide a training system for AI systems to use fine grain threads of compared to single thread on entire agent, to enable supporting large number of agents in a hierarchical task.

Yet another object of the present disclosure is to provide a training system for AI systems using SIMA to provide same instructions to multiple agents to reduce code density and create highly pipelined operations with large parallelism in training.

Yet another object of the present disclosure is to provide a training system for AI systems, to group similar of different agents into one thread blocks of operations with SIMA instructions.

Yet another object of the present disclosure is to provide a training system for AI systems to create the agents (actor plus critic) and map the threads, instead of mapping entire of algorithm into single thread.

Yet another object of the present disclosure is to provide a training system for AI systems, map each of the operations into a micro thread and to pipeline these micro threads, instead of napping entire agent into a single thread, thereby increasing the throughput of the processor.

Yet another object of the present disclosure is to provide a training system for performing thread mapping to Single-step Q learning, Sarsa, n step Q learning etc., Yet another object of the present disclosure is to provide an application domain specific instruction set and a processor architecture that creates an effective balance between exploration and exploitation of a reinforcement learning environment.

Yet another object of the present disclosure is to provide an application domain specific instruction set and a processor architecture that enable parallel learning and effective sharing of learning, amongst a plurality of reinforcement learning agents.

Yet another object of the present disclosure is to provide a processor architecture that necessitates fewer clock cycles in comparison to the conventional CPU/GPU, to implement reinforcement learning operations/tasks.

Yet another object of the present disclosure is to provide an application domain specific instruction set and a processor architecture that renders comparatively larger levels of abstraction, during the implementation of reinforcement learning operations/tasks.

These and other objects and advantages of the present invention will become readily apparent from the following detailed description taken in conjunction with the accompanying drawings.

SUMMARY

In order to overcome the drawbacks discussed hitherto, the present disclosure envisages processor architecture specifically designed to implement reinforcement learning operations. The processor architecture provides rich actionable data for scientific computing, cloud computing, robots, and IOT computing inter-ilia. The processor architecture includes a first processor (host processor), a first memory module (IRAM), a Complex Instruction fetch and decode (CISFD) unit, a second processor (Reinforcement learning processor), and a second memory module. In accordance with the disclosure, the processor architecture is configured for parallelism m reinforcement learning operations. The architecture is configured to train reinforcement learning agents using single instruction multiple agents (SIMA) based instructions to cause a plurality of agents following different policies execute in copies of same environments. Further, the best of all agents is selected and merged in a synchronous or asynchronous manner. Also, the processor architecture is designed to reduce training times by a processor architecture with multi agents and distributed training.

According to an embodiment herein, a computer-implemented system is provided for training artificial intelligence based systems. The system comprises a first processor that is configured to create at least one reinforcement learning agent and at least one corresponding reinforcement learning environment. The first processor is further configured to assign a reinforcement learning agent ID to the reinforcement learning agent, and a reinforcement learning environment ID to the reinforcement learning environment.

A first memory module is communicably coupled to the first processor. The first memory module is configured to store an application-domain specific instruction set (ASI). The application-domain specific instruction set comprises instructions for implementing the predetermined reinforcement learning operations. Each of the instructions incorporates at least one of the reinforcement learning agent ID and the reinforcement learning environment ID is treated as an operand.

A complex instruction fetch and decode (CISFD) unit is communicably coupled to the memory module. The CISFD unit is configured to decode at least one of the instructions, and generate a plurality of predetermined threads corresponding to decoded instruction. The CISFD unit is still further configured to embed at least one of the reinforcement learning agent ID and reinforcement learning environment ID associated with the decoded instruction into the predetermined threads.

A second processor is configured to execute the predetermined reinforcement learning operations. The second processor comprises a plurality of cores. The second processor is configured to process each of the predetermined threads in parallel using the plurality of cores, and apply a corresponding instruction onto at least one of a reinforcement learning agent. A reinforcement learning environment is identified by the reinforcement learning agent ID and reinforcement learning environment ID is embedded in the predetermined threads.

A second memory module is configured to cooperate with the second processor. The second memory module is a gradient memory. A plurality of gradients in the gradient memory is updated from each one of a plurality of agents working in parallel.

The second processor is further configured to train the reinforcement learning agents using application-domain specific instruction set (ASI), and wherein the application-domain specific instruction set are single instruction multiple agents (SIMA) based instructions. A plurality of agents is configured to work on a copy of same environment and work on mutually different policies in parallel. The plurality of agents is selected and merged in a synchronous or asynchronous manner.

According to an embodiment herein, the second processor is configured to create environment vectors corresponding to the reinforcement learning environment; create agent vectors corresponding to the plurality of reinforcement learning agents; associate the plurality of reinforcement learning agents to at least one reinforcement learning environment, and wherein the reinforcement learning agents follows a different exploration policies as compared with the reinforcement learning environment; initiate a training on the reinforcement learning agent represented by the reinforcement learning agent ID by using exploration instruction; generate a plurality of thread vectors and micro threads by the CISFD in response to initiation of training, and wherein the plurality of thread vectors comprises q-thread vector, a-thread vector, v-thread vector, g-thread vector and r thread vector, and wherein each operation is mapped into micro thread; map a plurality of reinforcement learning operations to the plurality of thread vectors, and wherein each thread vector corresponds to a plurality of reinforcement learning agents; update a gradient vector corresponding to at least one of an agent actor, and an agent critic, and wherein the agent actor corresponds to the q-thread vector and the agent critic corresponds to the v-thread vector; update an action vector from the agent actor corresponding to the a-thread; determine a gradient parameter of policy $d\theta$ and a gradient parameter of value function $d\theta v$ vector corresponding to the g-thread vector; and update a policy parameter $\theta$ and a parameter of value function $\theta v$ from determined gradient parameters $d\theta$ and $d\theta v$ in a gradient memory of the second memory module.

According to an embodiment herein, the plurality of thread vectors generated by the CISFD are indicative of the interaction between the reinforcement learning agent and the reinforcement learning environment. The plurality of thread vectors are executed for a predetermined time for each reinforcement learning agent.

According to an embodiment herein, the second processor is further configured to: trigger the reinforcement learning agent to interact with the reinforcement learning environment and enable the reinforcement learning agent to explore the reinforcement learning environment to deduce relevant learning therefrom; apply deduced relevant learning onto the reinforcement learning environment; trigger the reinforcement learning agent to exploit gathered learnings by further interacting with the reinforcement learning environment; construct at least one of a Markov Decision Process (MDP) and Semi-Markov Decision Process (SMDP) based on an interaction between the reinforcement learning agent and the reinforcement learning environment; selectively update the MDP and SMDP, based on learning achieved from the interaction between the reinforcement learning agent and the reinforcement learning environment; selectively create a backup of the MDP representative of the interaction between the reinforcement learning agent and the reinforcement learning environment; initiate a q-learning procedure on the reinforcement learning agent; associate a reward function with the reinforcement learning agent; enable the reinforcement learning agent to interact with the reinforcement learning environment for a predetermined time period; read a context corresponding to the reinforcement learning agent, and read the context corresponding to the reinforcement learning environment, and store the read context; initiate a predetermined deep-learning operation on the reinforcement learning agent; determine the optimal Q-value corresponding to a current state of the reinforcement learning agent; implement generalized policy iteration (GPI); implement on-policy and off-policy learning methods on the reinforcement learning agent; approximate a state-value function for the current state of the reinforcement learning agent, and determine an optimal state-value function for the current state of the reinforcement learning agent; and fetch Q-values, state-value functions and reward values corresponding to the reinforcement learning agent, from the corresponding memory partitions of the second memory module.

According to an embodiment herein, the second processor is further configured to feed training data into the neural network through the neural network data path, and initiate training of the neural network; download weights corresponding to the neural network; communicate with a predetermined deep neural network; selectively clear the weights assigned to the neural network; perform value-function approximation using the deep neural network, for the reinforcement learning agent represented by the reinforcement learning agent ID; and train the deep neural network using a predetermined learning context.

According to an embodiment herein, the instructions are configured to be simultaneously implemented on a plurality of reinforcement learning agents and a plurality of reinforcement learning environments. The CISFD unit is further configured to create the predetermined threads corresponding to each of the plurality of reinforcement learning agents and plurality of reinforcement learning environments. The CISFD unit still further configured to group the predetermined threads into a thread block.

According to an embodiment herein, the second memory module is partitioned into a gradient memory to store Global parameters θ, θv obtained from the training.

According to an embodiment herein, a method for training artificial intelligence based systems, is provided. The method comprising following computer-implemented steps: at least one reinforcement learning agent and at least one corresponding reinforcement learning environment are created using a first processor. A reinforcement learning agent ID is assigned to the reinforcement learning agent. A reinforcement learning environment ID is assigned to the reinforcement learning environment. An application-domain specific instruction set (ASI) is created. The application-domain specific instruction set comprises instructions for implementing the predetermined reinforcement learning operations. Each instruction is created by incorporating at least one of the real reinforcement learning agent ID and the reinforcement learning environment ID therein, as an operand. The application-domain specific instruction set is stored in a first memory module. At least one of the instructions is selectively fetched and decoding using a complex instruction fetch and decode (CISFD) unit. A plurality of predetermined threads is generated corresponding to the decoded instruction. At least one of the reinforcement learning agent ID and reinforcement learning environment ID associated with the decoded instruction is embedded into the predetermined threads. Each one of the predetermined dreads is executed in parallel using a second processor. The corresponding instruction is applied onto at least one of a reinforcement learning agent and reinforcement learning environment identified respectively by the reinforcement learning agent ID and reinforcement learning environment ID embedded in the predetermined threads. The reinforcement learning agents are trained using the second processor by executing application-domain specific instruction set (ASI). The application-domain specific instruction set are single instruction multiple agents (SIMA) based instructions.

According to an embodiment herein, the step of creating an application-domain specific instruction set (ASI), and incorporating the instructions into the ASI for creating environment vectors corresponding to the reinforcement learning environment; creating agent vectors corresponding to the plurality of reinforcement learning agents; associating the plurality of reinforcement learning agents to at least one reinforcement learning environment, and wherein the reinforcement learning agents follows a different exploration policies as compared with the reinforcement learning environment; initiating a training on the reinforcement learning agent represented by the reinforcement learning agent ID by using exploration instruction; generating a plurality of thread vectors and micro threads by the CISFD in response to initiation of training, and wherein the plurality of thread vectors comprises q-thread vector, a-thread vector, v-thread vector, g-thread vector and r thread vector; mapping a plurality of reinforcement learning operations to the plurality of thread vectors, and wherein each thread vector corresponds to a plurality of reinforcement learning agents; updating a gradient vector corresponding to at least one of an agent actor, and an agent critic, and wherein the agent actor corresponds to the q-thread vector and the agent critic corresponds to the v-thread vector; updating an action vector from the agent actor corresponding to the a-thread; determining a gradient parameter of policy dθ and gradient parameter of value function dθv vector corresponding to the g-thread vector; and updating policy parameter θ and parameter of value function θv from determined gradient parameters dθ and dθv in a gradient memory of the second memory module.

According to an embodiment herein, the plurality of thread vectors generated by the CISFD are indicative of the interaction between the reinforcement learning agent and the reinforcement learning environment. The plurality of thread vectors are executed for a predetermined time for each reinforcement learning agent.

According to an embodiment herein, the step of creating an application-domain specific instruction set (ASI), further includes the step of incorporating instructions into the ASI, for triggering the reinforcement learning agent to interact with the reinforcement learning environment and enabling the reinforcement learning agent to explore the reinforcement learning environment to deduce relevant learning therefrom; apply deduced relevant learning onto the reinforcement learning environment; trigger the reinforcement learning agent to exploit gathered learning by further interacting with the reinforcement learning environment; construct at least one of a Markov Decision Process (MDP) and Semi-Markov Decision Process (SMDP) based on interaction between the reinforcement learning agent and the reinforcement learning environment; selectively update the MDP and SMDP, based on learning achieved from the interaction between the reinforcement learning agent and the reinforcement learning environment; selectively create a backup of the MDP representative of the interaction between the reinforcement learning agent and the reinforcement learning environment; initiate a q-learning procedure on the reinforcement learning agent; associate a reward function with the reinforcement learning agent; perform generalized policy iteration (GPI); implement on-policy and off-policy learning methods on the reinforcement learning agent; enable the reinforcement learning agent to interact with the reinforcement learning environment for a predetermined time period; read a context corresponding to the reinforcement learning agent, and read the context corresponding to the reinforcement learning environment, and store the read context; initiate a predetermined deep-learning operation on the reinforcement learning agent represented by the reinforcement learning agent ID; determine the optimal Q-value corresponding to a current state of the reinforcement learning agent; fetch the Q-values, state-value functions, actions and reward values corresponding to the reinforcement learning agent, from the corresponding memory partitions of the second memory module; approximate a state-value function for the current state of the reinforcement learning agent, and determine an optimal state-value function for the current state of the reinforcement learning agent.

According to an embodiment herein, the step of executing each of the predetermined threads in parallel using a second processor, and applying the corresponding instruction onto at least one of a reinforcement learning agent and reinforcement learning environment identified respectively by the reinforcement learning agent ID and reinforcement learning environment ID embedded in the predetermined threads, and determining an action, a state-value function, Q-value and a reward value, based on execution of the instruction corresponding to the predetermined threads, further includes the following steps. The Q-values are determined based on the execution of a q-thread. The actions to be performed by the reinforcement learning processor are determined based on the execution of a-thread. The state-value functions are determined based on the execution of a v-thread. The reward values are determined based on the execution of an r-thread.

According to an embodiment herein, the step of determining an action based on the execution of a-thread, further includes the step of determining the action performed by the reinforcement learning agent in a predetermined state, and under a predetermined policy.

According to an embodiment herein, the step of determining the state-value functions based on the execution of a v-thread, further includes the step of determining a value associated with each state of the reinforcement learning agent, and representing the value as a state-value function.

According to an embodiment herein, the step of determining the reward values based on the execution of an r-thread, further includes the step of determining rewards obtained by the reinforcement learning agent for performing a predetermined action in a predetermined state, within the reinforcement learning environment, and storing the rewards as reward values.

According to an embodiment herein, a computer readable non-transitory storage medium is stored with computer readable instructions that are executed by a computer processor, to cause the computer processor to create at least one reinforcement learning agent and at least one corresponding reinforcement learning environment, and assign a reinforcement learning agent ID to the reinforcement learning agent, and assign a reinforcement learning environment ID to the reinforcement learning environment; create an application-domain specific instruction set (ASI), the application-domain specific instruction set comprising instructions for implementing the predetermined reinforcement learning operations; create each of the instructions by incorporating at least one of the reinforcement learning agent ID and the reinforcement learning environment ID therein, as an operand; configure each of the instructions to be simultaneously implemented on a plurality of reinforcement learning agents and a plurality of reinforcement learning environments; selectively fetch at least one of the instructions by using a complex instruction fetch and decode (CISFD) unit, and decode the instruction, and generate a plurality of predetermined threads corresponding to decoded instruction; embed into the predetermined threads, at least one of the reinforcement learning agent ID and reinforcement learning environment ID associated with corresponding instruction; process each of the predetermined threads in parallel, and apply the corresponding instruction onto at least one of a reinforcement learning agent and reinforcement learning environment identified by the reinforcement learning agent ID and reinforcement learning environment ID embedded in the predetermined threads; train the reinforcement learning agents using the second processor by executing application-domain specific instruction set (ASI), wherein the application-domain specific instruction set are single instruction multiple agents (SIMA) based instructions.

According to an embodiment herein, the computer readable instructions, when executed by the computer processor, further cause the computer processor to create environment vectors corresponding to the reinforcement learning environment; create agent vectors corresponding to the plurality of reinforcement learning agents; associate the plurality of reinforcement learning agents to at least one reinforcement learning environment, and wherein the reinforcement learning agents follows a different exploration policies as compared with the reinforcement learning environment; initiate a training on the reinforcement learning agent represented by the reinforcement learning agent ID by using exploration instruction; generate a plurality of thread vectors and micro threads by the CISFD in response to initiation of training, and wherein the plurality of thread vectors comprises q-thread vector, a-thread vector, v-thread vector, g-thread vector and r thread vector; map a plurality of reinforcement learning operations to the plurality of thread vectors, and wherein each thread vector corresponds to a plurality of reinforcement learning agents; update a gradient vector corresponding to at least one of an agent actor, and an agent critic, and wherein the agent actor corresponds to the q-thread vector and the agent critic corresponds to the v-thread vector; update an action vector from the agent actor corresponding to the a-thread; determine a gradient parameter of policy $d\theta$ and a gradient parameter of value function $d\theta v$ vector corresponding to the g-thread vector; and update a policy parameter $\theta$ and a parameter of value function $\theta v$ from determined gradient parameters $d\theta$ and $d\theta v$ in a gradient memory of the second memory module.

According to an embodiment herein, the plurality of thread vectors generated by the CISFD are indicative of the interaction between the reinforcement learning agent and the reinforcement learning environment, the plurality of thread vectors are executed for a predetermined time for each reinforcement learning agent.

The host processor is configured to create at least one reinforcement learning agent and at least one reinforcement learning environment. Further, the host processor assigns an agent ID and environment ID to the reinforcement learning agent and the reinforcement learning environment respectively.

In accordance with the present disclosure, the IRAM is coupled to the reinforcement learning processor and is configured to store an application-domain specific instruction set (ASI). The application-domain specific instruction set (ASI) includes instructions optimized for performing reinforcement learning operations. The instructions incorporate at least one of the reinforcement learning agent ID and the reinforcement learning environment ID as an operand. The CISFD unit is configured to fetch upto 'N' instructions simultaneously for decoding. The CISFD unit generates a plurality of threads, for example, an r-thread, a v-thread, a q-thread, and an a-thread corresponding to a decoded instruction. Each of the threads are embedded with either the reinforcement learning agent ID or reinforcement learning environment ID (depending upon the corresponding instruction). The threads corresponding to the decoded instruction are transmitted to the reinforcement learning processor. The threads are executed in parallel using a plurality of processing cores of the reinforcement learning processor. In an example, if 'N' is the number of processor cores, then 'N' instructions are fetched by CISFD for simultaneous execution.

In accordance with the present disclosure, the reinforcement learning processor is a multi-core processor. Each processor core of the reinforcement learning processor includes a plurality of execution units. Further, each execution unit includes a fetch/decode unit, dispatch/collect unit, and a plurality of registers for storing learning context and inferencing context corresponding to a reinforcement learning agent. The fetch/decode unit is configured to fetch the threads corresponding to the decoded instruction. Subsequently, the execution unit performs ALU operations corresponding to the threads, on the registers storing the learning context and the inferencing context. The results (of the execution of threads) are generated based on the learning context and inferencing context stored in the registers. Subsequently, the results are transmitted to the collect/dispatch unit which stores the results (of the execution of threads) in predetermined partitions of a second memory module.

In accordance with the present disclosure, subsequent to the execution of threads corresponding to a decoded instruction, an action (performed by the reinforcement learning agent at every state), at least one state-value function, at least one Q-value, and at least one reward function are determined. The action, state-value function, Q-value, and reward function thus generated represent the interaction between the reinforcement learning agent and the corresponding reinforcement learning environment (either of which was specified as an operand in the instruction executed by the reinforcement learning processor).

In accordance with the present disclosure, the second memory module is partitioned into an 'a-memory module', a 'v-memory module', a 'q-memory module', and an 'r-memory module'. The 'a-memory module' stores information corresponding to the action(s) performed by the reinforcement learning agent at every state, during an interaction with the reinforcement learning environment. Further, the 'v-memory module' stores the 'state-value functions' which represent the value associated with the reinforcement learning agent at every state thereof. Further, the 'q-memory module' stores 'Q-values' which are generated using a state-action function indicative of the action(s) performed by the reinforcement learning agent at every corresponding state. Further, the 'r-memory module' stores the information corresponding to the 'rewards' (also referred to as reward values) obtained by the reinforcement learning agent in return for performing a specific action while being in a specific state.

In accordance with the present disclosure, the reinforcement learning processor uses neural network data paths to communicate with a neural network which in turn uses the actions, state-value functions, Q-values and reward values generated by the reinforcement learning processor to approximate an optimal state-value function as well as an optimal reward function. Further, the neural network also programs the reinforcement learning agent with a specific reward function, which dictates the actions to be performed by the reinforcement learning agent to obtain the maximum possible reward.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

Although the specific features of the embodiments herein are shown in some drawings and not in others. This is done for convenience only as each feature may be combined with any or all of the other features in accordance with the embodiments herein.

BREIEF DESCRIPTION OF THE ACCOMPANYING DRAWINGS

The other objects, features and advantages will be apparent to those skilled in the art from the following description and the accompanying drawings. In the accompanying drawings, like numerals are used to represent/designate the same components previously described.

FIG. 1B illustrates a block diagram of an execution unit of the processor core, in accordance with the present disclosure.

FIG. 1C illustrates a block diagram indicating the format of 'threadID', in accordance with the present disclosure.

FIG. 1D illustrates a block diagram indicating the format for addressing the memory partitions of the second memory module, in accordance with the present disclosure.

Figure 6A:
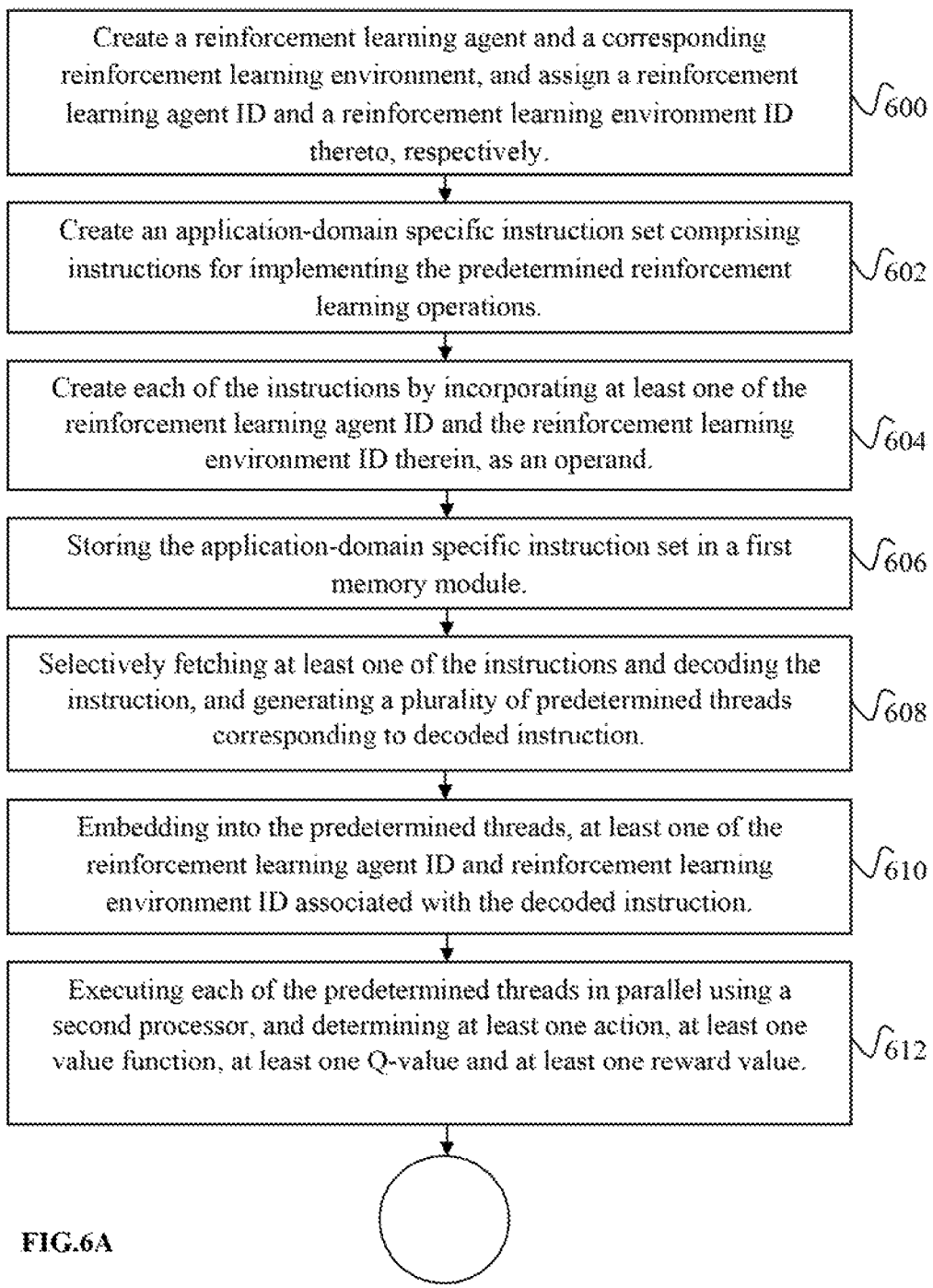
Figure 6B:
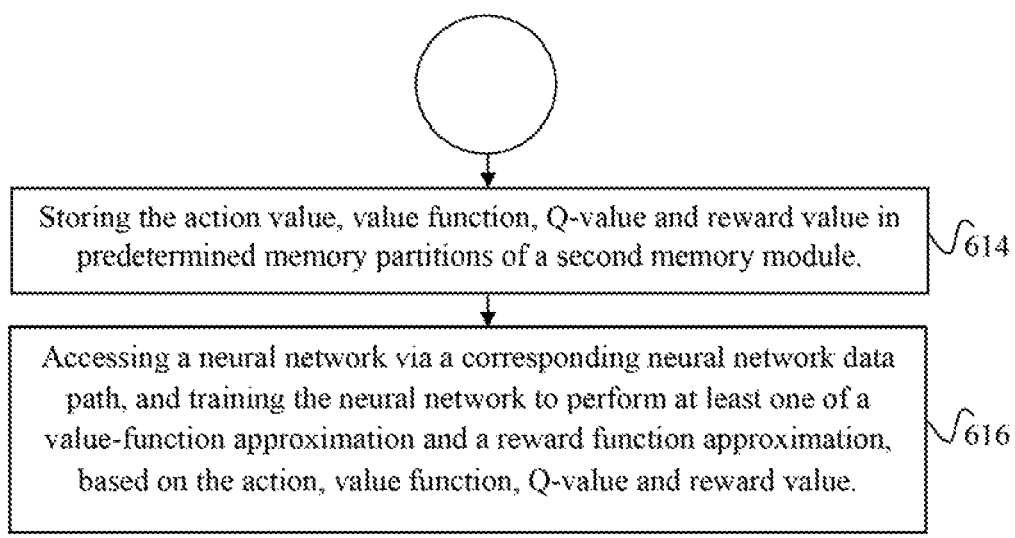

FIG. 6A and FIG. 6B in combination illustrate a flowchart explaining the steps involved in a method for implementing predetermined reinforcement learning using the reinforcement learning processor, in accordance with the present disclosure.

Figure 7A:
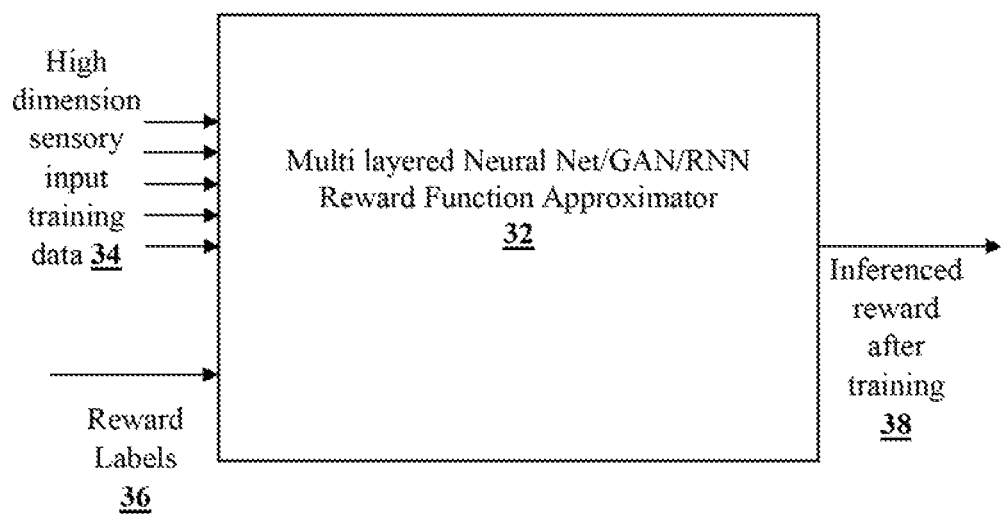

FIG. 7A is a block diagram illustrating a reward function approximator, in accordance with the present disclosure.

Figure 7B:
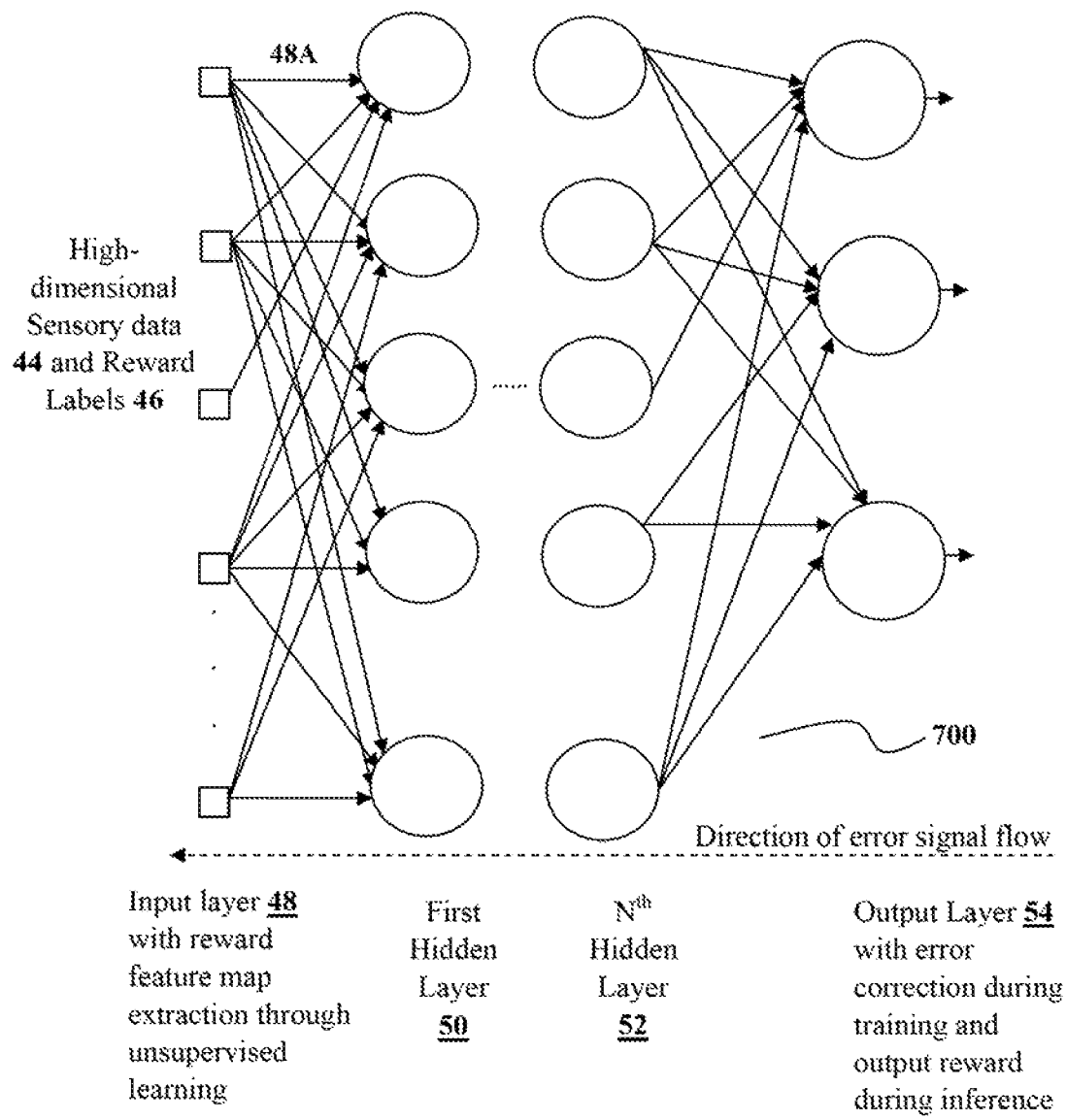

FIG. 7B is a block diagram illustrating an exemplary deep neural network implementing the reward function approximator described in FIG. 7A.

Figure 7C:
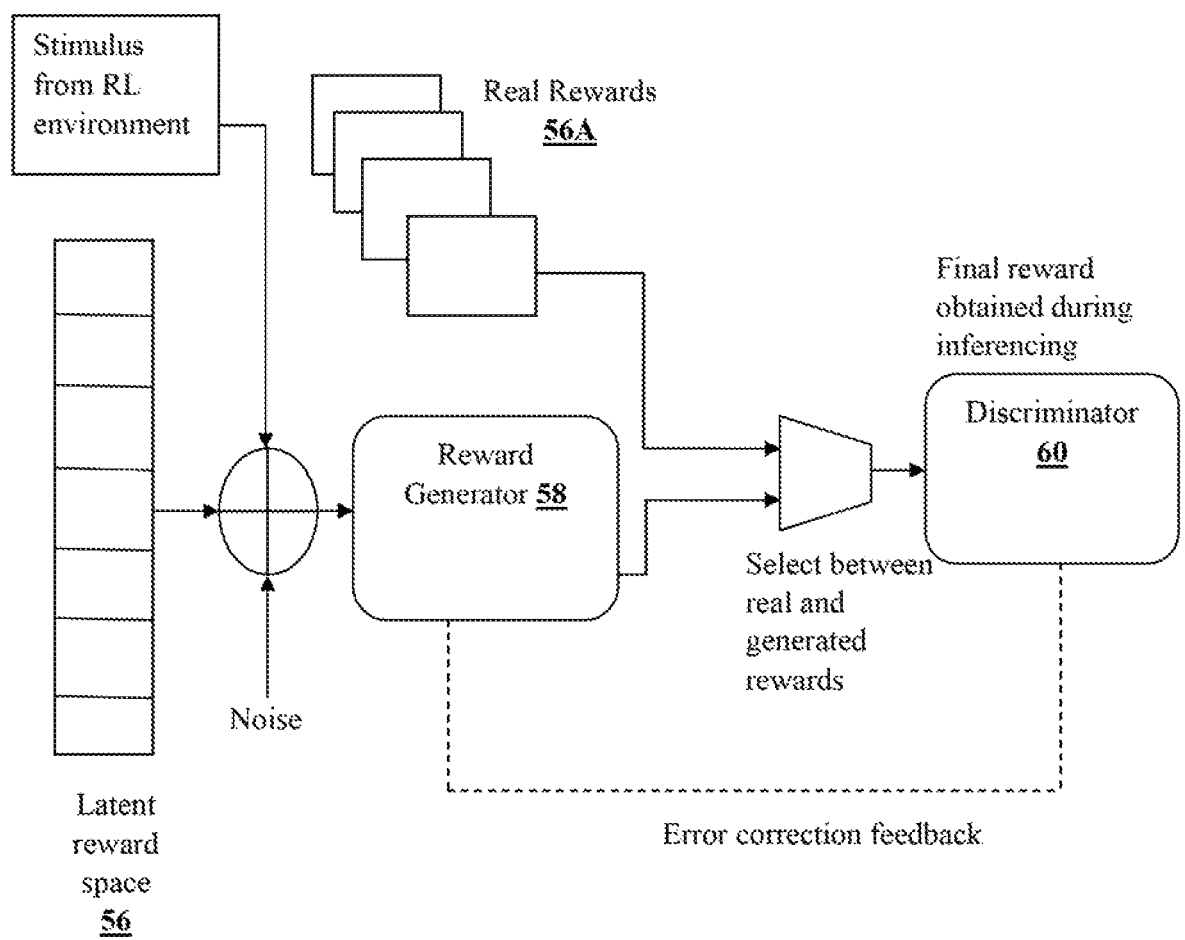

FIG. 7C is a block diagram illustrating a Generative Adversarial Network (GAN), used for reward function approximation, in accordance with the present disclosure.

Figure 8:
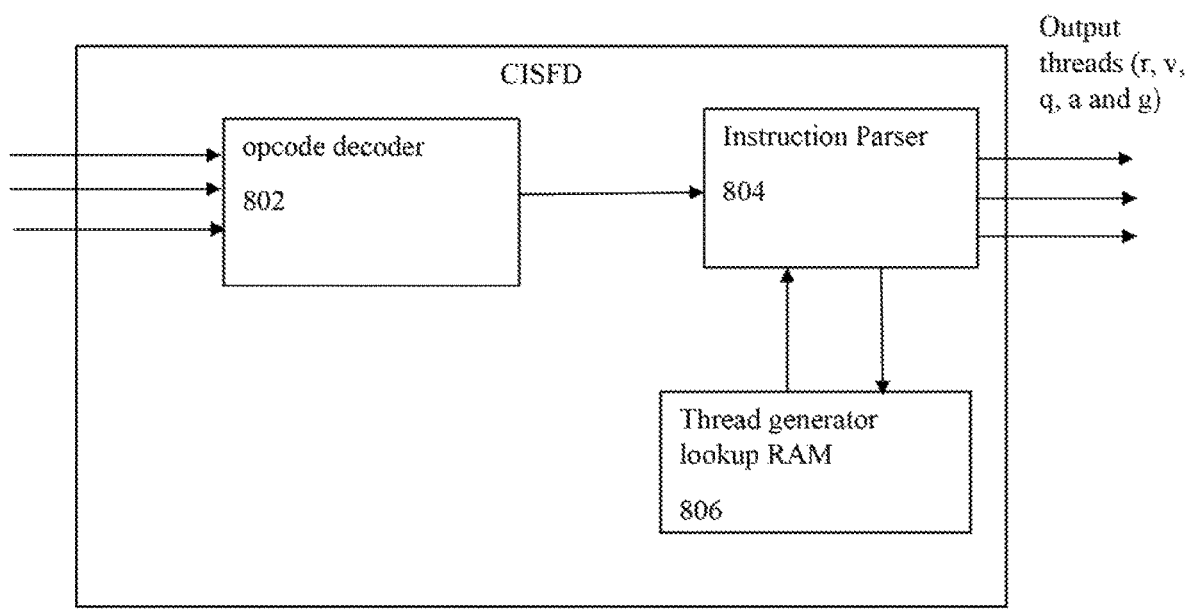

FIG. 8 illustrates a programmable CISFD generating thread blocks, in accordance present disclosure.

Figure 9A:
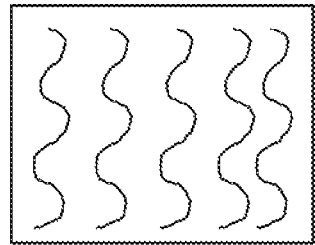

FIG. 9A to 9E illustrates the plurality of threads blocks gene ed by the CISFD. FIG. 9A illustrates a r-micro thread block, in accordance with the present disclosure.

Figure 10A:
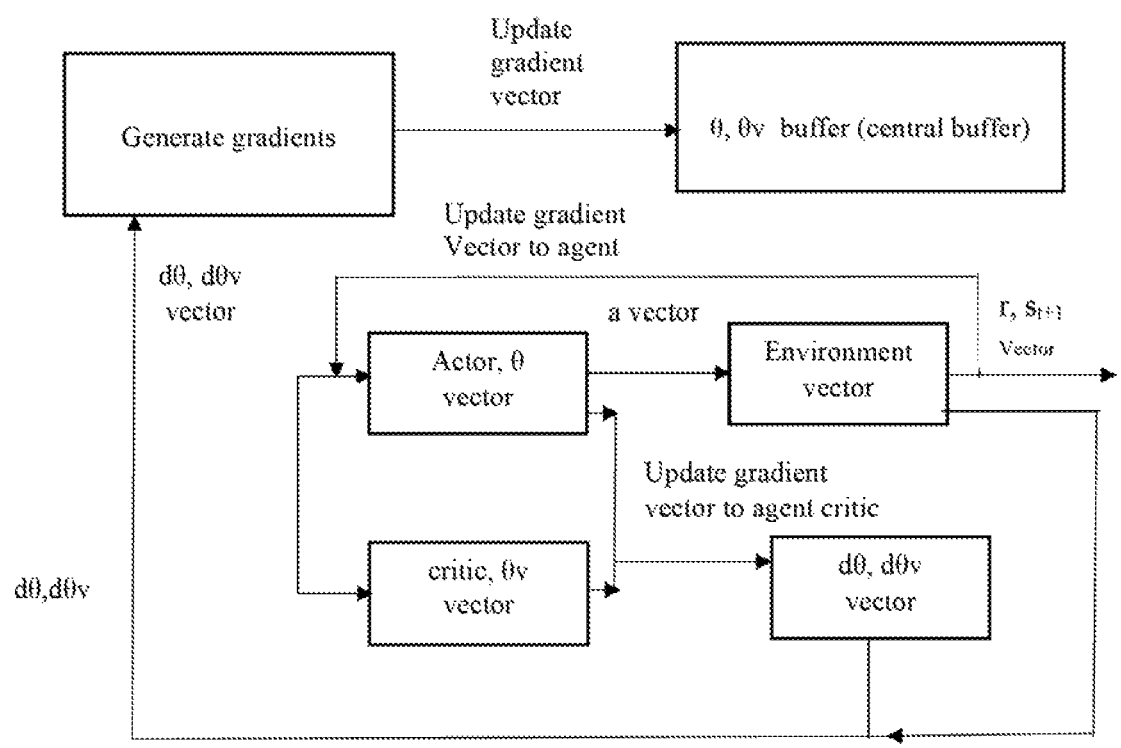

FIG. 10A is a block diagram illustrating a training algorithm implemented by the processor architecture for training reinforcement learning agents in the present disclosure.

Figure 10B:
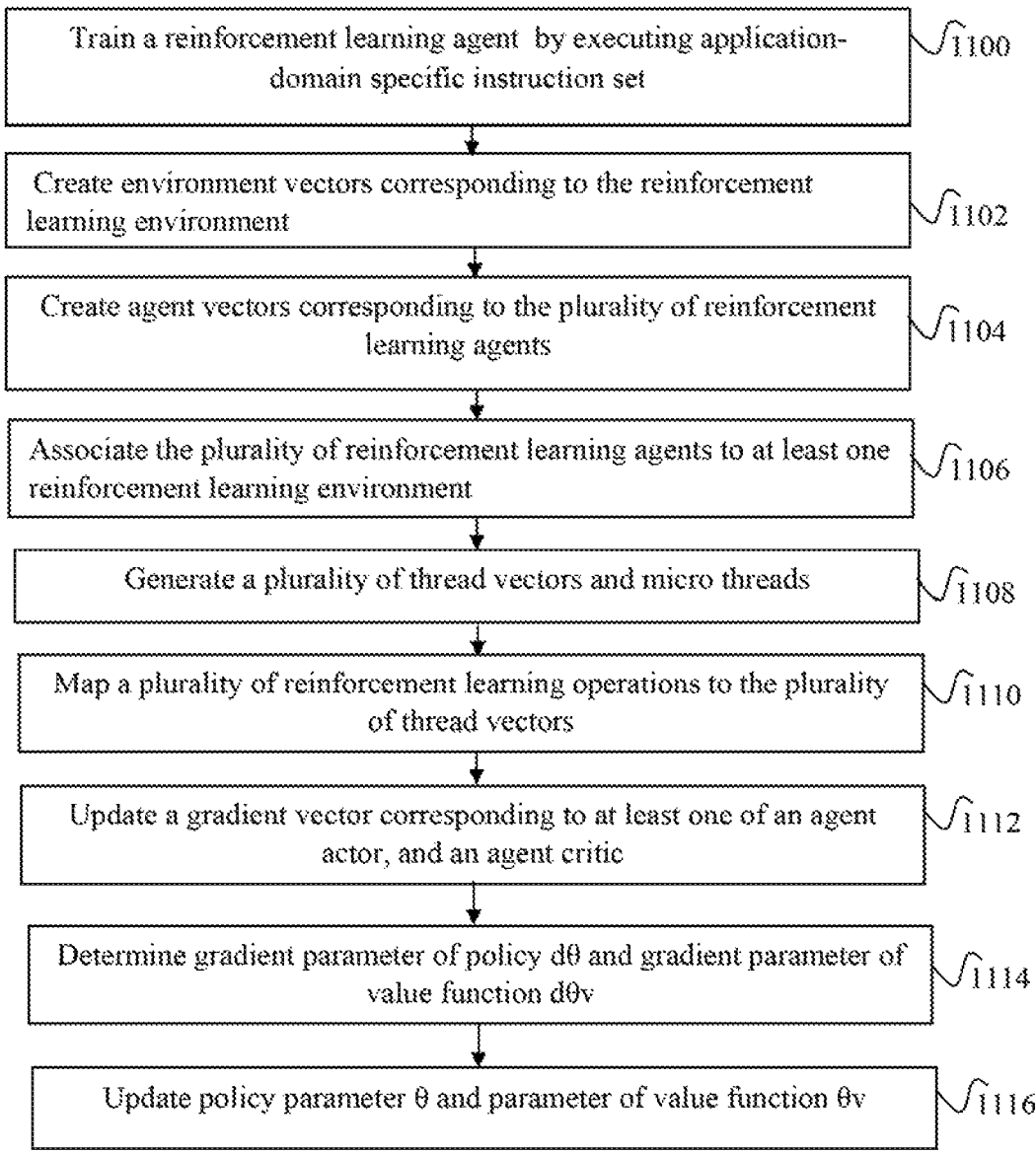

FIG. 10B illustrates a flowchart depicting a method to implement training of reinforcement learning agents, in accordance with the present disclosure.

Although the specific features of the embodiments herein are shown in some drawings and not in others. This is done for convenience only as each feature may be combined with any or all of the other features in accordance with the embodiments herein.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limited sense.

In view of the drawbacks discussed hitherto, there was felt a need for a processor specifically designed for and specialized in executing reinforcement learning operations. In order to address the aforementioned need, the present disclosure envisages a processor that has been specifically configured (programmed) to execute reinforcement learning operations by the way of implementing an instruction set (an application-specific instruction set) which incorporates instructions specifically designed for the implementation of reinforcement learning tasks/operations.

The present disclosure envisages a processor (termed as 'reinforcement learning processor' hereafter) specifically configured to implement reinforcement learning tasks: operations. In accordance with the present disclosure, the application-specific instruction set executed by the reinforcement learning processor incorporates 'Single Instruction Multiple Agents (SIMA)' type instructions. SIMA type instructions are specifically designed to be implemented simultaneously on a plurality of reinforcement learning agents which in turn are interacting with corresponding reinforcement learning environments.

In accordance with the present disclosure, the SIMA type instructions are specifically configured to receive either a reinforcement learning agent ID or a reinforcement learning environment ID as the operand. The reinforcement learning agent ID (RL agent ID) corresponds to a reinforcement learning agent, while the reinforcement learning environment ID (RL environment ID) corresponds to a reinforcement learning environment (with which the reinforcement learning agent represented by reinforcement learning agent ID interacts). The SIMA type instructions envisaged by the present disclosure, when executed by the reinforcement learning processor perform predetermined reinforcement learning activities directed onto either a reinforcement learning agent or a corresponding reinforcement learning environment specified as a part (operand) of the SIMA type instructions.

In accordance with an exemplary embodiment of the present disclosure, the SIMA type instructions when executed by the reinforcement processor, trigger a reinforcement learning agent to interact with a corresponding reinforcement learning environment and further enable the reinforcement learning agent to explore the reinforcement learning environment and deduce relevant learnings from the reinforcement learning environment. Additionally, SIMA type instructions also provide for the deduced learnings to be iteratively applied onto the reinforcement learning environment to deduce furthermore learnings therefrom.

Further, the SIMA type instructions when executed by the reinforcement learning processor, also enable the reinforcement learning agent to exploit the learnings deduced from any previous interactions between the reinforcement learning agent and the reinforcement learning environment. Further, the SIMA type instructions also enable the reinforcement learning agent to iteratively exploit the learnings deduced from the previous interactions, in any of the subsequent interactions with the reinforcement learning environment. Further, the SIMA type instructions also provide for construction of a Markov Decision Process (MDP) and a Semi-Markov Decision Process (SMDP) based on the interaction between the reinforcement learning agent and the corresponding reinforcement learning environment.

Further, the SIMA type instructions also enable selective updating of the MDP and SMDP, based on the interactions between the reinforcement learning agent and the corresponding reinforcement learning environment. The SIMA type instructions, when executed by the reinforcement learning processor, also backup the MDP and SMDP. Further, the SIMA type instructions when executed on the reinforcement learning agent, enable the reinforcement learning agent to initiate a Q-learning procedure, and a deep-learning procedure and also to associate a reward function in return for the Q-learning and the deep-learning performed by the reinforcement learning agent.

Further, the SIMA type instructions, upon execution by the reinforcement learning processor, read and analyze the 'learning context' corresponding to the reinforcement learning agent and the reinforcement learning environment. Further, the SIMA type instructions determine an optimal Q-value corresponding to a current state of the reinforcement learning agent, and trigger the reinforcement learning agent to perform generalized policy iteration, and on-policy and off-policy learning methods. Further, the SIMA type instructions, upon execution, approximate a state-value function and a reward function for the current state of the reinforcement learning agent. Further, the SIMA type instructions, when executed by the reinforcement learning processor, train at least one of a deep neural network (DNN) and a recurrent neural network (RNN) using a predetermined learning context, and further trigger the deep neural network or the recurrent neural network for approximating at least one of a reward function and state-value function corresponding to the current state of the reinforcement learning agent.

Figure 1:
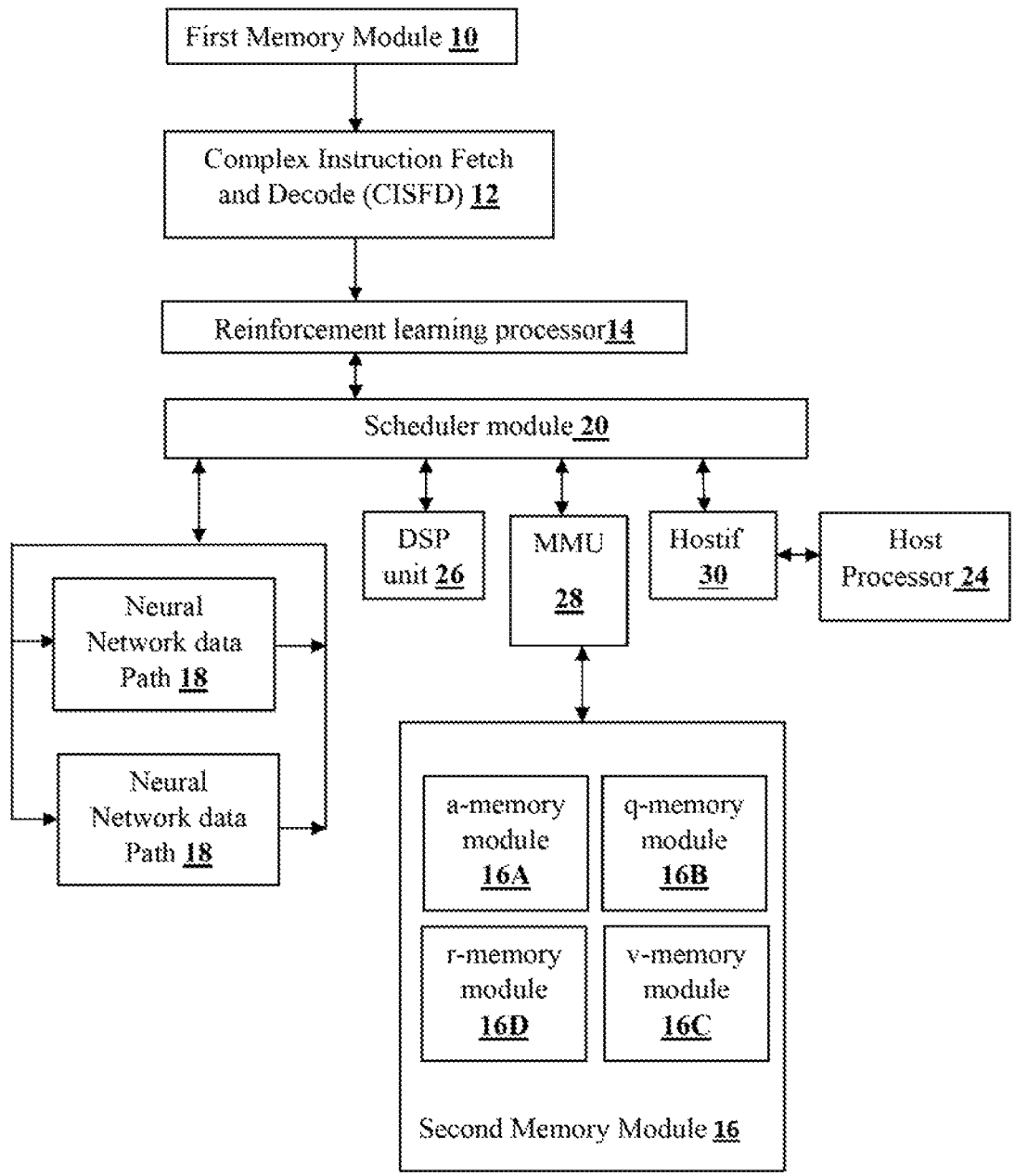
FIG. 1 illustrates a block-diagram of a system for implementing predetermined reinforcement learning operations, in accordance with the present disclosure.

Referring to FIG. 1, there is shown a block diagram illustrating the components of the system 100 for implementing the tasks/operations pertinent to reinforcement learning. The system 100, as shown in FIG. 1 includes a first memory module 10 (preferably an IRAM). The first memory module stores the application-specific instruction set (ASI), which incorporates the SIMA instructions (referred to as 'instructions' hereafter) for performing predetermined reinforcement learning tasks. The instructions, as described in the above paragraphs, are configured to incorporate either a reinforcement learning agent ID or a reinforcement learning environment ID as the operand. The reinforcement learning agent ID represents a reinforcement learning agent (not shown in figures) trying to achieve a predetermined goal in an optimal manner by the way of interacting with a reinforcement learning environment (represented by reinforcement learning environment ID). Each of the instructions stored in the first memory module 10 are linked to corresponding 'opcodes'. The 'opcodes' cot responding to each of the instructions are also stored in the first memory module 10. Further, the first memory module 10 also stores the reinforcement learning agent ID and reinforcement learning environment ID corresponding to each of the reinforcement learning agents and the reinforcement learning environments upon which the instructions (of the application-specific instruction set) are to be implemented.

The system 100 further includes a Complex Instruction Fetch and Decode (CISFD) unit 12 communicably coupled to the first memory module 10. The CISFD unit 12 fetches from the first memory unit 10, an instruction to be applied to a reinforcement learning agent or a reinforcement learning environment. Subsequently, the CISFD retrieves the 'opcode' corresponding to the fetched instruction, from the first memory module 10. As explained earlier, the instruction fetched by the CISFD unit 12 incorporates at least one of a reinforcement learning agent ID and a reinforcement learning environment ID as the operand. Depending upon the value of the operand, the CISFD unit 12 determines the reinforcement learning agent/reinforcement learning environment on which the fetched instruction is to be implemented.

Subsequently, the CISFD unit 12, based on the 'opcode' and 'operand' corresponding to the fetched instruction, generates a plurality of predetermined threads, namely a 'v-thread', 'a-thread', 'q-thread' and an 'r-thread', corresponding to the fetched instruction. The threads generated by the CISFD unit 12 are representative of the characteristics of either the reinforcement learning agent or the reinforcement learning environment or both, upon which the fetched instruction is executed. The characteristics represented by the predetermined threads include at least the action(s) performed by the reinforcement learning agent at every state, value associated with each state of the reinforcement learning agent, reward(s) gained by the reinforcement learning agent during the interaction with the reinforcement learning environment. In order to associate each of the threads with the corresponding reinforcement learning agent/reinforcement learning environment, the operand of the instruction (the instruction for which the threads are created) is embedded into the v-thread, a-thread, q-thread and r-thread.

In accordance with the present disclosure, the 'v-thread' upon execution determines the 'state-value functions' corresponding to each state of the reinforcement learning agent. The 'state-value functions' indicate the 'value' associated with each of the states of the reinforcement learning agent. Similarly, the 'a-thread' upon execution determines the 'actions' performed by the reinforcement learning agent in every state thereof, and subsequently generates 'control signals', for implementing the 'actions' associated with the reinforcement learning agent. Similarly, the 'q-thread' upon execution determines 'Q-values' which are generated using a state-action function representing the actions performed by the reinforcement learning agent at every corresponding state. Similarly, the 'r-thread' on execution determines the rewards obtained by the reinforcement learning agent for performing a specific action while being in a specific state.

In accordance with the present disclosure, the system 100 further includes a second processor 14 (referred to as 'reinforcement learning processor' hereafter) specifically configured for executing the instructions embodied in the application-specific instruction set (ASI), and for implementing the reinforcement tasks represented by the instructions. The reinforcement learning, processor 14 executes the instruction fetched by the CISFD unit 12, by the way of executing the corresponding v-thread, a-thread, q-thread and r-thread. The reinforcement learning processor 14 is preferably a multi-core processor comprising a plurality of processor cores.

Figure 1A:
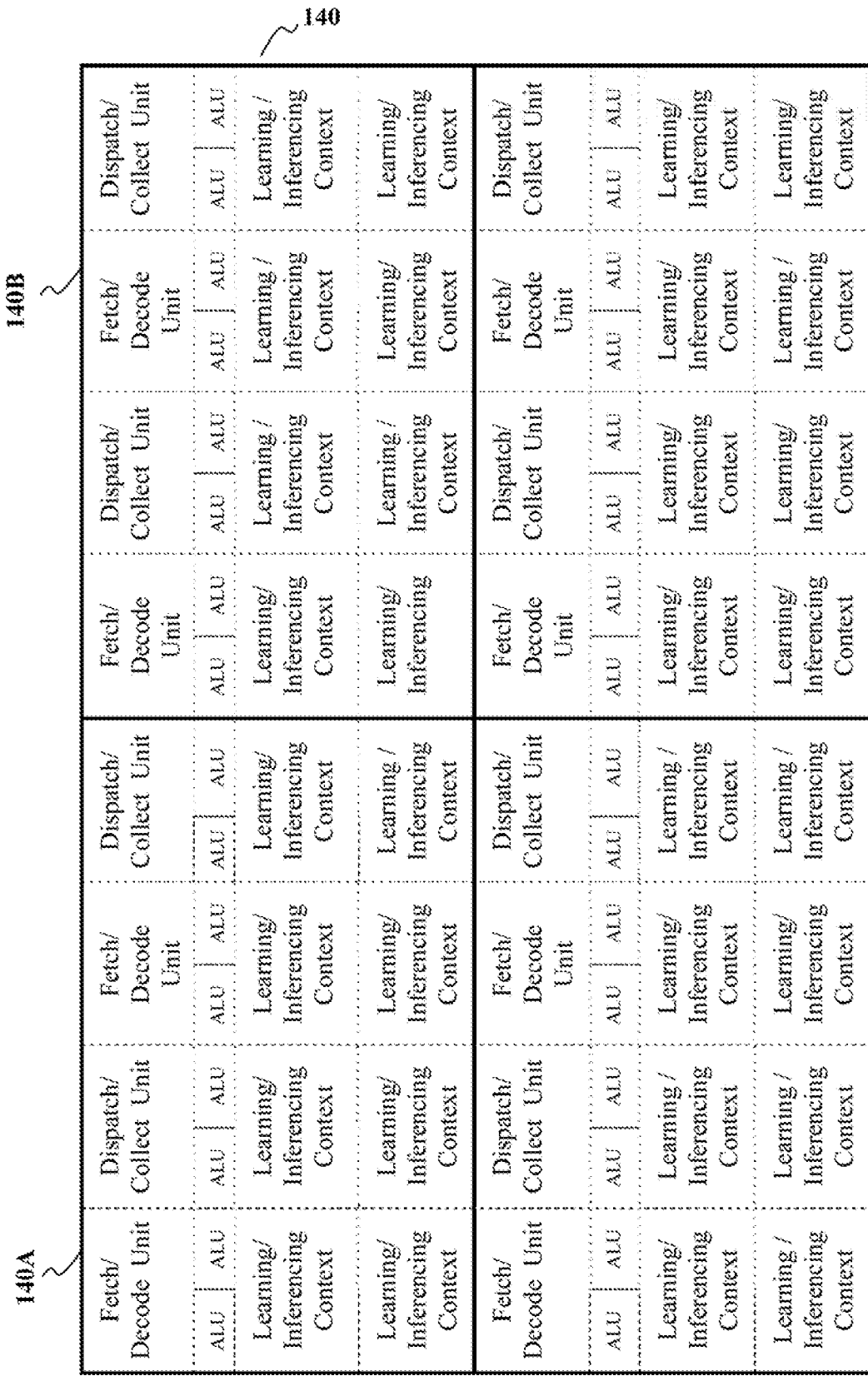
FIG. 1A illustrates a block diagram of a processor core of the reinforcement learning processor, in accordance with the present disclosure.

In accordance with the present disclosure, each of the processor cores of the reinforcement learning processor 14 incorporate at least 'four' execution units (FIG. 1A describes a processor core 140 having 'four' execution units 140A, 140B, 140C and 140D). The threads, i.e., v-thread, a-thread, q-thread and r-thread are preferably assigned to individual execution units of a processor core respectively, thereby causing the threads (v-thread, a-thread, q-thread and r-thread) to be executed in parallel (simultaneously). The reinforcement learning processor 14, based on the operand associated with the fetched instruction, determines the reinforcement learning agent or the reinforcement learning environment upon which the threads (i.e., v-thread, a-thread, q-thread, and r-thread) are to be executed. In an example, the reinforcement learning processor 14 executes the v-thread, a-thread, q-thread and r-thread on a reinforcement learning agent identified by corresponding reinforcement learning agent ID, and determines at least one 'state-value function', at least one 'action', at least one 'Q-value', and at least one 'rewards corresponding to the reinforcement learning agent identified by the reinforcement learning agent ID.

The 'state-value function', 'action', 'Q-value' and 'reward' thus determined by the reinforcement learning processor 14 are stored in a second memory module 16. In accordance with the present disclosure, the second memory module 16 is preferably bifurcated into at least 'four' memory partitions, namely, an 'a-memory module' 16A, a 'v-memory module' 16B, a 'q-memory module' 16C, and an 'r-memory module' 16D. The 'a-memory module' 16A stores the information corresponding to the action performed by the reinforcement learning agent (identified by the reinforcement learning agent ID) at every state. The actions are stored on the 'a-memory module' 16A in a binary encoded format.

The 'v-memory module' 16B stores the 'state-value functions' indicative of the value associated with every state of the reinforcement learning agent (identified by the reinforcement learning agent ID) while the reinforcement learning agent follows a predetermined policy. The 'v-memory module' 16B also stores the 'optimal state-value functions' indicative of an optimal state-value associated with the reinforcement learning agent under an optimal policy. Further, the 'q-memory module' 16C stores 'Q-values' which are generated using a state-action function representative of a correlation between the actions performed by the reinforcement learning agent at every state and under a predetermined policy. The 'q-memory module' 16C also stores tale 'optimal Q-value' for every state-action pair associated with the reinforcement learning agent, and adhering to an optimal policy. The term 'state-action function' denotes the action performed by the reinforcement learning agent at a specific state. Further, the 'r-memory module' 16D stores the 'rewards' (reward values) obtained by the reinforcement learning agent, in return for performing a specific action while being in a specific state.

Subsequently, the reinforcement learning processor 14 selectively retrieves the 'state-value functions', 'actions', 'Q-values' and 'rewards' corresponding to the reinforcement learning agent (and indicative of the interaction between the reinforcement learning agent and the reinforcement learning environment) from the 'a-memory module' 16A, 'v-memory module' 16B, 'q-memory module' 16C, and 'r-memory module' 16D respectively, and transmits the retrieved 'state-value functions', 'actions', 'Q-values' and 'rewards' to a neural network (illustrated in FIG. 7A) via a corresponding neural network data path 18. Subsequently, the reinforcement learning processor 14 trains the neural network to approximate reward functions that in turn associate a probable reward with the current state of the reinforcement learning agent, and also with the probable future states and future actions of the reinforcement learning agent. Further, the reinforcement learning processor 14 also trains the neural network to approximate state-value functions that in turn approximate a probable value for all the probable future states of the reinforcement learning agent.

In accordance with an embodiment of the present disclosure, the reinforcement learning processor is further configured to train the reinforcement learning agents using application-domain specific instruction set (ASI), wherein the application-domain specific instruction set are single instruction multiple agents (SIMA) based instructions, and wherein a plurality of agents are configured to work on a copy of same environment and work on mutually different policies in parallel, and wherein the plurality of agents is selected and merged in a synchronous or asynchronous mann In accordance with the present disclosure, the CISFD unit 12 is configured to receive the SIMA type instructions fetched from the first memory module 10 and identify the 'opcode' corresponding to the received instruction. Subsequently, the CISFD unit 12 determines and analyzes the 'operand' (either the reinforcement learning agent ID or the reinforcement learning environment ID) and identifies the corresponding reinforcement learning agent or the reinforcement learning environment upon which the instruction is to be executed. Subsequently, the CISFD unit 12 converts the instruction into 'a-thread', 'v-thread', 'q-thread' and 'r-thread' (collectively referred to as a 'thread block'). The CISFD unit 12 also embeds the corresponding reinforcement learning agent ID or the reinforcement learning environment ID, so as to associate the instruction (received from the first memory module 10) with the corresponding thread block and the corresponding reinforcement learning agent/reinforcement learning environment. Subsequently, each of the threads, i.e., the 'a-thread', 'v-thread', 'q-thread' and 'r-thread' are assigned to respective execution units of a processor core of the reinforcement learning processor 14. In this case, each of the threads are simultaneously executed by 'four' execution units of the processor core.

In accordance with an exemplary embodiment of the present disclosure, if the CISFD unit 12 fetches the instruction 'optval agent ID', then the CISFD unit 12 decodes the instruction to determine the 'opcode' corresponding to the instruction, and subsequently determines the function to be performed in response to the instruction, based on the 'opcodes'. Subsequently, the CISFD unit 12 triggers the creation of the 'a-thread', 'v-thread', 'q-thread' and 'r-thread' corresponding to the instruction 'optval', and triggers the reinforcement learning processor 14 to execute the 'a-thread', 'v-thread', 'q-thread' and 'r-thread' as predetermined. Arithmetic Logic Unit (ALU) operations. The CISFD unit 12 instructs the reinforcement learning processor 14 to execute the 'a-thread', 'v-thread' 'q-thread' and 'r-thread' on the reinforcement learning agent/reinforcement learning environment identified by the 'operand' (reinforcement learning agent ID/reinforcement learning environment ID). The resultant of the execution of the threads are stored in 'a-memory module' 16A, 'v-memory module' 16B, 'q-memory module' 16C, and 'r-memory module' 16B respectively.

In accordance with the present disclosure, during the execution of the 'a-thread', 'v-thread', 'q-thread' and 'r-thread' by the reinforcement learning processor 14, if the instruction corresponding to the aforementioned threads includes a reinforcement learning agent ID as an operand, then in such a case, the reinforcement learning processor 14 accesses the 'agent context' (described in FIG. 2A) corresponding to the reinforcement learning agent identified by the reinforcement learning agent ID. Subsequently, the reinforcement learning processor 14, by the way of executing the predetermined operations (on the context register storing the 'agent context') determines the states associated with the reinforcement learning agent, actions to be performed by the reinforcement learning agent, rewards accrued by the reinforcement learning agent, and the policy to be followed by the reinforcement learning agent. By using the information corresponding to the 'states', 'actions', 'rewards' and 'policy' associated with the reinforcement learning agent, the reinforcement learning processor 14 determines 'state-value functions', 'actions', 'Q-values' and 'rewards' corresponding to the reinforcement learning agent. Subsequently, the 'state-value functions', 'actions', 'Q-values' and 'rewards' are transmitted by the reinforcement learning processor 14 to the second memory module 16 for storage.

In accordance with the present disclosure, the CISFD unit 12 could be conceptualized either as a fixed hardware implementation or as a programmable thread generator. In the event that the CISFD unit 12 is conceptualized as a fixed hardware implementation, then each, of the instructions is decoded and subsequently executed by dedicated hardware. Alternatively, if the CISFD unit 12 is conceptualized as a programmable thread generator, then each instruction is mapped to output threads ('a-thread', 'v-thread', 'q-thread' and 'r-thread'). The output threads are preferably sequence of 'Read Modify Write (RMW)' operations performed on respective memory modules ('a-memory module' 16A, 'v-memory module' 16B, 'q-memory module' 16C, and 'r-memory module' 16D), with the 'Modify (M)' operation being performed as an ALU operation.

In accordance with the present disclosure, each of the processor cores (a processor core 140 illustrated in FIG. 1A) of the reinforcement learning processor 14 incorporate predetermined number of execution units (execution units 140A, 140B, 140C and 140D illustrated in FIG. 1A). Each of the execution units execute the threads corresponding to the SIMA instruction fetched from the first memory module 10. As shown in FIG. 1B, an execution unit 140A incorporates a fetch/decode unit 14A and a dispatch/collection unit 14B. The fetch/decode unit 14A is configured to fetch the ALU instructions from the CISFD unit 12 for execution. The dispatch/collection unit 14B accesses the 'a-memory module' 16A, 'v-memory module' 16B, 'q-memory module' 16C, and 'r-memory module' 16D to complete the execution of the threads ('a-thread', 'v-thread', 'g-thread' and 'r-thread'). Further, the execution unit 140A also stores the 'learning context' and the 'inferencing context' corresponding to the reinforcement learning agent/reinforcement learning environment represented by the operand of the SIMA instruction. The 'learning context' and the 'inferencing context' are stored across a plurality of status registers, constant registers and configuration registers (not shown in figures).

The term 'learning context' represents the characteristics associated with a reinforcement learning environment with which the reinforcement learning agent interacts, and learns from. Further, the term 'learning context' also represents a series of observations and actions which the reinforcement learning agent has obtained as a result of the interaction with the reinforcement learning environment. The term 'inferencing context' represents the manner in which the reinforcement learning agent behaves (i.e., performs actions) subsequent to learning from the interaction with the reinforcement learning environment.

In accordance with the present, disclosure, execution of each of the SIMA instructions is denoted using a 'coreID'. The 'coreID' is determined based on the processor core executing the SIMA instruction. Further, each of the learning contexts stored in the corresponding execution unit of the processor core (executing the SIMA instruction) are identified using a 'contextID'. Further, each of the threads (i.e., 'a-thread', 'v-thread', 'q-thread' and 'r-thread') corresponding to the SIMA instruction are identified by a combination of a 'threadID' and the 'coreID' and the 'contextID'. The combination of 'threadID', 'coreID' and the 'contextID' is illustrated in FIG. 1C.

In accordance with the present disclosure, 'learning context' is associated with the 'exploration' activities performed by a particular reinforcement learning agent within a corresponding reinforcement learning environment. The term 'exploration' characterizes the activities in which the reinforcement learning agent interacts with the reinforcement learning environment by the way of performing predetermined actions, and learns from the interactions with the reinforcement learning environment. Further, 'inferencing context' is associated with the 'exploitation' activities performed by the reinforcement learning agent within the corresponding reinforcement learning environment. The term 'exploitation' characterizes the activities in which the reinforcement learning agent decides upon the actions to be performed, based on the learnings gathered from the previous interactions with the reinforcement learning environment. Any of the well known algorithms such as epsilon-greedy algorithm, Boltzmann sweep algorithm, epsilon-soft policy, softmax action selection policy are utilized for the purpose of 'exploitation', depending upon the suitability of the algorithm to the reinforcement learning environment.

Referring to the block diagram illustrated in FIG. 1D, the term 'agentID' denotes the reinforcement learning agent performing either exploitation of exploration activity. The term 'envID' denotes the reinforcement learning environment within which the reinforcement learning agent is performing either the exploration or exploitation activity. A particular reinforcement learning environment (denoted by 'envID') could interact with multiple reinforcement learning agents (denoted by respective agentIDs). Therefore, 'agentID' represents the specific reinforcement learning agent interacting with the reinforcement learning environment. Further, 'coreID' represents the processor core (of the reinforcement learning processor 14) executing the SIMA instruction applied upon either the reinforcement learning agent identified by 'agentID' or the reinforcement learning environment represented by 'envID'. Further, 'contextID' represents the context (exploitation or exploration) of the activity performed by the reinforcement learning agent (represented by 'agentID') by the way of interaction with the reinforcement learning environment (represented by 'envID'), as a part of the execution of the SIMA instruction. Every processor core (represented by 'coreID') is configured to simultaneously implement multiple contexts (represented by respective contextIDs). Further, 'threadID' represents the threads (i.e., 'a-thread', 'v-thread', 'q-thread' and 'r-thread') corresponding to the SIMA instruction applied onto either the reinforcement learning agent identified by 'agentID' or the reinforcement learning environment represented by 'envID'.

Referring again to FIG. 1, the system 100 further includes a (scalable) scheduler module 20 that provides the second processor 14 with selective access to the neural network data paths 18. The scheduler module 20 also controls the operations of a Digital Signal Processing (DSP) unit 26, a Memory Management Unit (MMU) 28, and the software driver modules ('Hostif' drivers) 30 that facilitates communication between the reinforcement learning processor 14 and a first processor 24 (referred to as 'host processor' hereafter). Further, the scheduler module 20 allocates memory space in each of the aforementioned memory modules (i.e., 'a-memory module' 16A 'v-memory module' 16B, 'q-memory module' 16C, and 'r-memory module' 16D) for the results of the execution of the 'a-thread', 'v-thread', 'q-thread' and 'r-thread' to be written thereto. Additionally, the scheduler module 20 is also configured to selectively prioritize the activities (exploration and exploitation) of predetermined reinforcement learning agents. Further, the scheduler module 20 also prioritizes the activities (exploration and exploitation) performed upon predetermined reinforcement learning environments. Additionally, the scheduler module 20 selectively prioritizes the interaction between the reinforcement learning processor 14 and the host processor 24.

Referring to FIG. 1 again, the 'a-memory module' 16A stores information corresponding, to the actions performed by the reinforcement learning agent. The 'v-memory module' 16B stores the 'state-value functions' indicative of the value associated with every state of the reinforcement learning agent, under a predetermined policy. The 'v-memory module' 16B also stores the 'optimal state-value function' indicative of an optimal value associated with every state of the reinforcement learning agent under an optimal policy. Further, the 'q-memory module' 16C stores 'Q-values' which are generated using a state-action function which represents a correlation between the actions performed by the reinforcement learning agent at every state and under a predetermined policy. The 'q-memory module' 16C also stores the 'optimal Q-values' for every state-action pair associated with the reinforcement learning agent, and adhering to an optimal policy. The term 'state-action pair' denotes the action performed by the reinforcement learning agent at a specific state. Further, the 'r-memory module' 16D stores the 'rewards' (reward values) obtained by the reinforcement learning agent, in return for performing a specific action while being in a specific state.

Figure 1E:
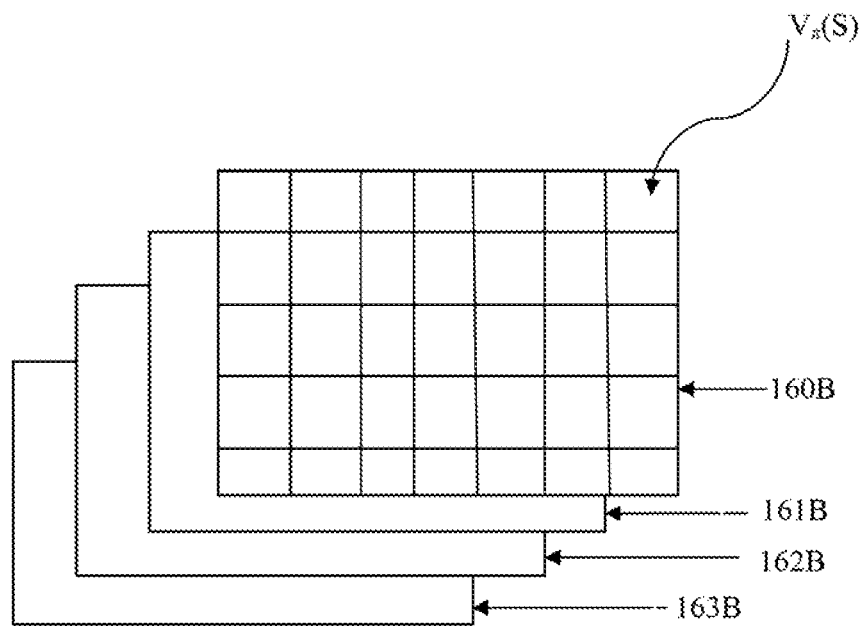
FIG. 1E illustrates a block diagram indicating the memory banks corresponding to the v-memory module, in accordance with the present disclosure.

In accordance with the present disclosure, the 'v-memory module' 16B is bifurcated into a plurality of memory banks as shown in FIG. 1E, with each memory bank of the 'v-memory module' 16B storing 'state-value function $V\pi(S)$' indicative of the value of a specific state of the reinforcement learning agent under a predetermined policy. As shown in FIG. 1E, the 'v-memory module' 16B is bifurcated into 'four' exemplary memory banks 160B, 161B, 162B and 163B. For example, memory bank 160B stores the 'state-value function' indicative of a 'first' value corresponding to a 'first' state of the reinforcement learning agent under a predetermined policy. Further, memory bank 161B stores the 'state-value function' indicative of a 'second' value corresponding to a 'second' state of the reinforcement learning agent under the predetermined policy. Further, memory bank 162B stores the 'state-value function' indicative of a 'third' value corresponding to a 'third' state of the reinforcement learning agent under the predetermined policy. Further, memory bank 163B stores the 'state-value function' indicative of a 'forth' value corresponding to a 'forth' state of the reinforcement learning agent under the predetermined policy.

Figure 1F:
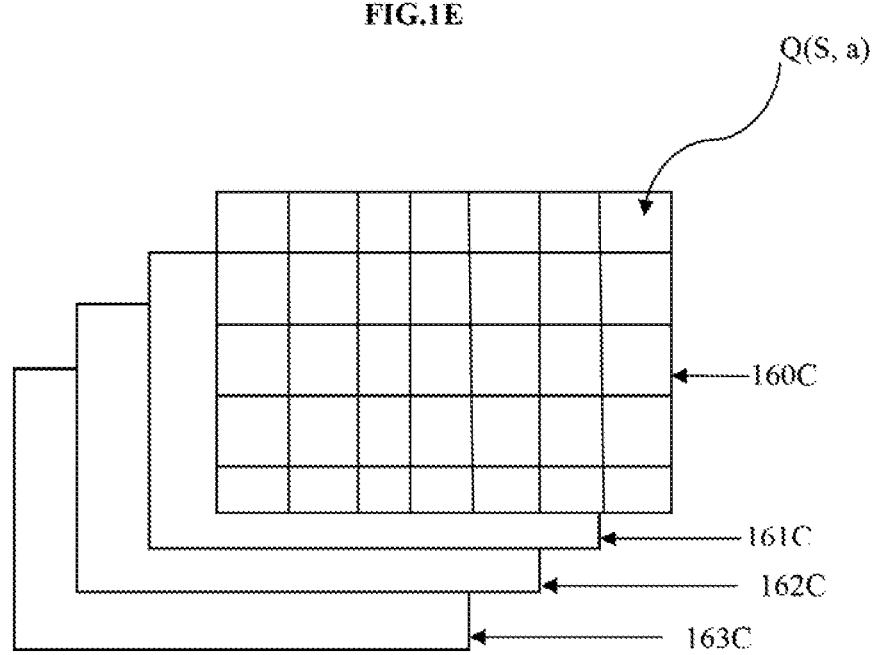
FIG. 1F illustrates a block diagram indicating the memory banks corresponding to the q-memory module, in accordance with the present disclosure.

In accordance with the present disclosure, the 'q-memory module' 16C is bifurcated into a plurality of memory banks as shown in FIG. 1F. As shown in FIG. 1F, the 'q-memory module' 16A is bifurcated into 'four' exemplary memory banks 160C, 161C, 162C and 163C. Each memory bank of the 'q-memory module' 16C stores the 'Q-value' corresponding to an action performed by the reinforcement learning agent, at a particular state and under the predetermined policy. For example, memory bank 160C stores the 'Q-value' corresponding to a 'first' action performed by the reinforcement agent while being at a 'first' state and following a predetermined policy. Further, memory bank 161C stores the 'Q-value' corresponding to a 'second' action performed by the reinforcement agent while being at a 'second' state and following the predetermined policy. Further, memory bank 162C stores the 'Q-value' corresponding to a 'third' action performed by the reinforcement agent while being at a 'third' state and following the predetermined policy. Further, memory bank 163C stores the 'Q-value' corresponding to a 'forth' action performed by the reinforcement assent while being at a 'forth' state and following the predetermined policy.

Figure 1G:
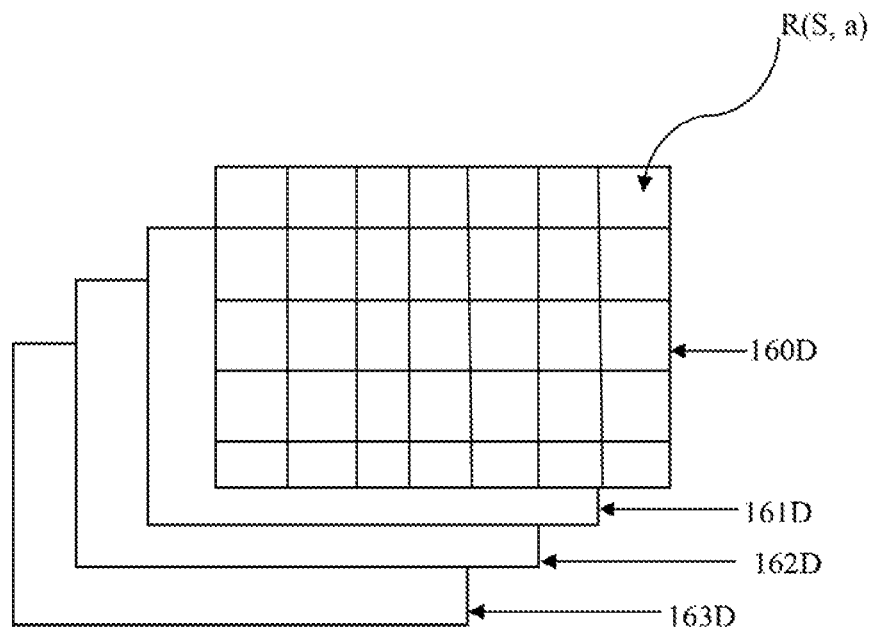
FIG. 1G illustrates a block diagram indicating the memory banks corresponding to the r-memory module, in accordance with the present disclosure.

Similarly, the 'r-memory module' 16D is bifurcated into a plurality of memory banks as shown in FIG. 1G, with each memory bank of the 'r-memory module' 16D storing a 'reward value' indicative of the reward obtained by the reinforcement learning agent, in return for performing a specific action (while being) in a specific state, and under the predetermined policy. As shown in FIG. 1G, the 'r-memory module' 16D is bifurcated into 'four' exemplary memory banks 160D, 161D, 162D and 163D. The memory bank 160D stores a reward value indicative of the reward obtained by the reinforcement learning agent, in return for performing a 'first' action (while being) in a 'first' state, under a predetermined policy. Further, memory bank 161D stores a reward value indicative of the reward obtained by the reinforcement learning agent, in return for performing a 'second' action in a 'second' state under the predetermined policy. Further, memory bank 162D stores a reward value indicative of the reward obtained by the reinforcement learning agent, in return for performing a 'third' action in a 'third' state under the predetermined policy. Further, memory bank 163D gores a reward value indicative of the reward obtained by the reinforcement learning agent, in return for performing a 'forth' action in a 'forth' state under the predetermined policy.

In accordance with the present disclosure, the 'v-memory module' 16B, the 'q-memory module' 16C and the 'r-memory module' 16D are accessed by the CISFD unit 12 and the reinforcement learning processor 14 by using a combinational sequence of 'envID', 'agentID', 'stateID', and 'actionID'. As explained in the aforementioned paragraphs, the term 'envID' denotes the reinforcement learning environment within which the reinforcement learning agent is performing either the exploration or exploitation activity, and the term 'agentID' denotes the reinforcement learning agent performing either the exploration or exploitation activity. Further, 'stateID' denotes the current state of the reinforcement learning agent, and the term 'actionID' denotes the action undertaken (performed) by the reinforcement learning agent while being in a specific state which is denoted by 'stateID'.

In the case of 'v-memory module' 16B which is bifurcated into memory banks 160B, 161B, 162B and 163B, memory bank 160B stores the 'state-value function' indicative of a 'first' value corresponding to a 'first' state (represented by stateID) of the reinforcement learning agent (represented by agentID) under the predetermined policy. The 'envID' representing the reinforcement learning environment remains unchanged for the 'four' exemplary memory banks 160B, 161B, 162B and 163B since the reinforcement learning agent (represented by 'agentID') interacts with only one reinforcement learning environment at a given point of time. Similarly, the memory bank 161B stores the 'state-value function' indicative of a 'second' value corresponding to a 'second' state (represented by 'stateID') of a reinforcement learning agent (represented by 'agentID') under the predetermined policy. Similarly, the memory bank 162B stores the 'state-value function' indicative of a 'third' value corresponding to a 'third' state (represented by 'stateID') of a reinforcement learning agent (represented by 'agentID') under the predetermined policy. Similarly, the memory bank 163B stores the 'state-value function' indicative of a 'forth' value corresponding to a 'forth' state (represented by 'stateID') of a reinforcement learning agent (represented by 'agentID') under the predetermined policy.

In the case of 'q-memory module' 16C which is bifurcated into memory banks 160C, 161C, 162C and 163C, memory bank 160C stores the 'Q-value' corresponding to a 'first' action (represented by 'actionID') performed by the reinforcement agent (represented by 'agentID') while being at a 'first' state (represented by 'stateID') and following the predetermined policy. Similarly, memory bank 161C stores the 'Q-value' corresponding to a 'second' action (represented by 'actionID') performed by the reinforcement agent (represented by the 'agentID') while being; at a 'second' state (represented by 'stateID') and following the predetermined policy. Similarly, memory bank 162C stores the 'Q-value' corresponding to a 'third' action (represented by 'actionID') performed by the reinforcement agent (represented by the 'agentID') while being at a 'third' state (represented by 'stateID') and following the predetermined policy. Similarly, memory bank 163C stores the 'Q-value' corresponding to a 'forth' action (represented by 'actionID') performed by the reinforcement agent (represented by the 'agentID') while being at a 'forth' state (represented by 'stateID') and following the predetermined policy.

In the case of 'r-memory module' 16D which is bifurcated into memory banks 160D, 161D, 162D and 163D, the memory bank 160D stores a reward value indicative of the reward obtained by the reinforcement learning agent (represented by 'agentID'), in return for performing a 'first' action (represented by 'actionID') in a 'first' state (represented by 'stateID'), under the predetermined policy. The 'envID' representing the reinforcement learning environment remains unchanged for the 'four' exemplary memory banks 160D, 161D, 162D and 163D since the reinforcement learning agent (represented by 'agentID') interacts with only one reinforcement learning environment at a given point of time. Similarly, memory bank 161D stores a reward value indicative of the reward obtained by the reinforcement learning agent (represented by 'agentID'), in return for performing a 'second' action (represented by 'actionID') in a 'second' state (represented by 'stateID'), wider the predetermined policy. Similarly, memory bank 162D stores a reward value indicative of the reward obtained by the reinforcement learning agent (represented by 'agentID'), in return for performing a 'third' action (represented by 'actionID') in a 'third' state (represented by 'stateID'), under the predetermined policy. Similarly, memory bank 163D stores a reward value indicative of the reward obtained by the reinforcement learning agent (represented by 'agentID'), in return for performing a 'forth' action (represented by 'actionID') in a 'forth' state (represented by 'stateID'), under the predetermined policy.

In accordance with the present disclosure, for the interaction between the reinforcement learning agent and the reinforcement learning environment, the 'Q-values' are segregated based on the corresponding action and corresponding state, and subsequently stored in the memory banks 160C, 161C, 162C and 163C. Similarly, the 'state-value functions' are segregated, based on the value of the reinforcement learning agent at every specific state, and stored on the memory banks 160B, 161B, 162B and 163B. Similarly, the rewards are segregated based on the action, and the state and the corresponding action, and stored in the memory banks 160D, 161D, 162D and 163D.

In order to obtain an optimal Q-value, the 'Q-values' stored on the memory banks 160C, 161C, 162C and 163C are extracted serially (i.e., beginning with the first bank 160C and moving to the last bank 163C), and the highest of the 'Q-values' extracted from the memory banks 160C, 161C, 162C and 163C is determined and considered as the optimal Q-value. The state-action pair corresponding to the highest of the Q-values is identified. The optimal Q-value and the corresponding state-action pair are utilized as a benchmark for iteratively approximating the actions, rewards and an optimal policy for any new states of the reinforcement learning agent.

Similarly, state-value functions stored on the memory banks 160B, 161B, 162B and 163B are retrieved serially (i.e., beginning with the first bank 160B and moving to the last bank 163B), and the highest value of the reinforcement learning agent across the various states (in this case, the first state, second state, third state and forth state) is identified, and is considered as the optimal state-value function. The optimal state-value function could be utilized to estimate an optimal policy that is considered to be better than any other policies available for the reinforcement learning agent.

Similarly, rewards stored on the memory banks 160D, 161D, 162D and 163D are retrieved serially (i.e., beginning with the first bank 160D and moving to the last bank 163D), and the highest of the retrieved rewards is determined, and the corresponding state-action pair is identified. The highest of the retrieved rewards is used as a benchmark for approximating a reward function, and for determining the manner in which the reward obtained by the reinforcement learning agent during the course of interaction with the reinforcement learning environment could be maximized.

In accordance with the present disclosure, the system 100 further includes a first processor 24 (referred to as 'host processor' hereafter) configured to create at least one reinforcement learning agent and a corresponding reinforcement learning environment, thereby initiating a computational approach fix implementing reinforcement learning operations. The first processor 24 creates at least one reinforcement learning agent and a corresponding reinforcement learning environment by the way of programming predetermined, common memory mapped configuration registers. The reinforcement learning agent is represented by a 1-bit wide 'agent register', while the reinforcement learning environment is represented by a 1-bit wide 'environment register'. The reinforcement learning agent is represented by 'agentID', and the reinforcement learning agent is mapped to the reinforcement learning environment by 32-bit 'envID'. In accordance with an exemplary embodiment of the present disclosure, when the host processor writes the value '1' or any other predetermined signature on to the predetermined configuration registers, the reinforcement learning agent and the reinforcement learning environment are created. Further, the host processor 24 preferably loads the application-specific instruction set comprising the instructions for implementing predetermined reinforcement learning operations, onto the first memory module 10. Subsequently, the host processor 24 triggers the reinforcement learning processor 14 to execute the instructions corresponding to the reinforcement learning operations.

Figure 2A:
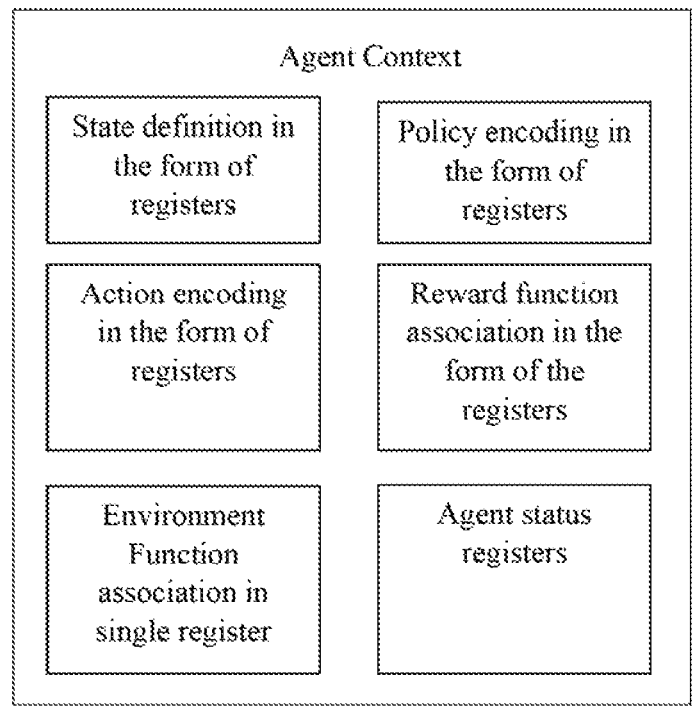
FIG. 2A is a block diagram illustrating the agent context corresponding to the reinforcement learning agent, in accordance with the present disclosure.
Figure 2B:
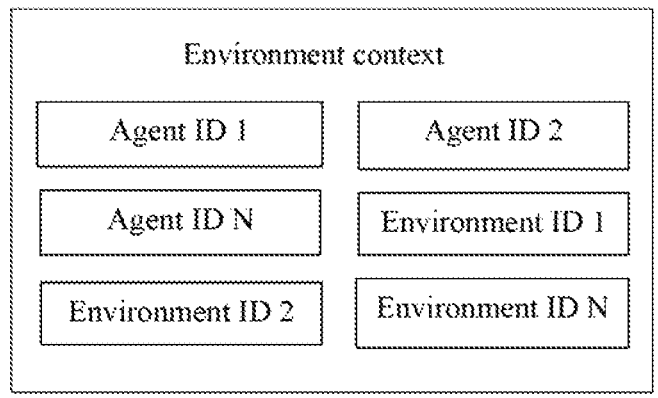
FIG. 2B is a block diagram illustrating the environment context corresponding to the reinforcement learning environment, in accordance with the present disclosure.

In accordance with the present disclosure, each of the reinforcement learning agents are associated with an 'agent context', and each of the reinforcement learning environments are associated with an 'environment context'. The 'agent context' as shown in FIG. 2A is a collection of configuration registers and host registers, which store information pertaining to the status the reinforcement learning agent, actions to be performed by the reinforcement learning agent, reward function associated with the agent, policy to be followed by the reinforcement learning agent, and the like. The 'environment context' as shown in FIG. 2B is also a collection of configuration registers and host registers, which store the information including 'agentID' corresponding to each of the reinforcement learning agents interacting with the reinforcement learning environment, and 'experimentID' corresponding to the reinforcement learning experiments performed by each of the reinforcement learning agents.

Figure 3:
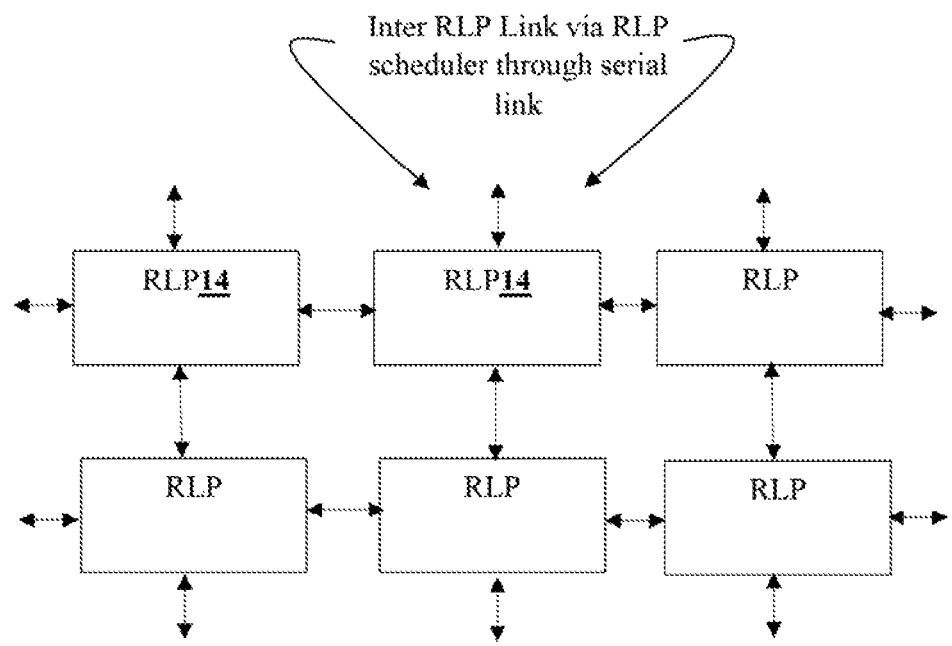
FIG. 3 is a block diagram illustrating the multi-processor configuration of the reinforcement learning processor, in accordance with the present disclosure.

Referring to FIG. 3, there is shown a block diagram illustrating a multi-processor configuration of the reinforcement learning processor 14, in accordance with an exemplary embodiment of the present disclosure. The multi-processor configuration of the reinforcement learning processor 14 (all the reinforcement learning processors collectively represented by reference numeral 14) is conceptualized using an inter-core connection of the reinforcement learning processor 14. The reinforcement learning processor 14 incorporates '4' ports to form a communication link (connection) with '4' reinforcement learning processors as exemplified in FIG. 3. The reinforcement learning processor 14 incorporates a scalable architecture which provides for the number of processing cores to be scaled in line with the complexity of reinforcement learning operations/tasks. The scheduler module 20 (described in FIG. 1) of the reinforcement learning processor 14 is configured to be implemented on a multi-chip mode and provide the reinforcement learning processor 14 with required internal memory access and external memory access. Further, the scheduler module 20 also provides for intercommunication between the reinforcement learning processors assembled using the multi-processor configuration. The first memory module 10 (described in FIG. 1) and the second memory module 16 (described in FIG. 1) are not hierarchical, and are configured to be accessed based on the synchronization between the processing cores of the reinforcement learning processor 14. Therefore, the first memory module 10 and the second memory module 16 provide for a consistent implementation of reinforcement learning tasks, even on the multi-chip mode. The reinforcement learning processor 14 when implemented in a multi-processor configuration provides for comparatively higher levels of parallelism as far as the interaction between a plurality of reinforcement learning agents and corresponding reinforcement learning environments is concerned.

Figure 4:
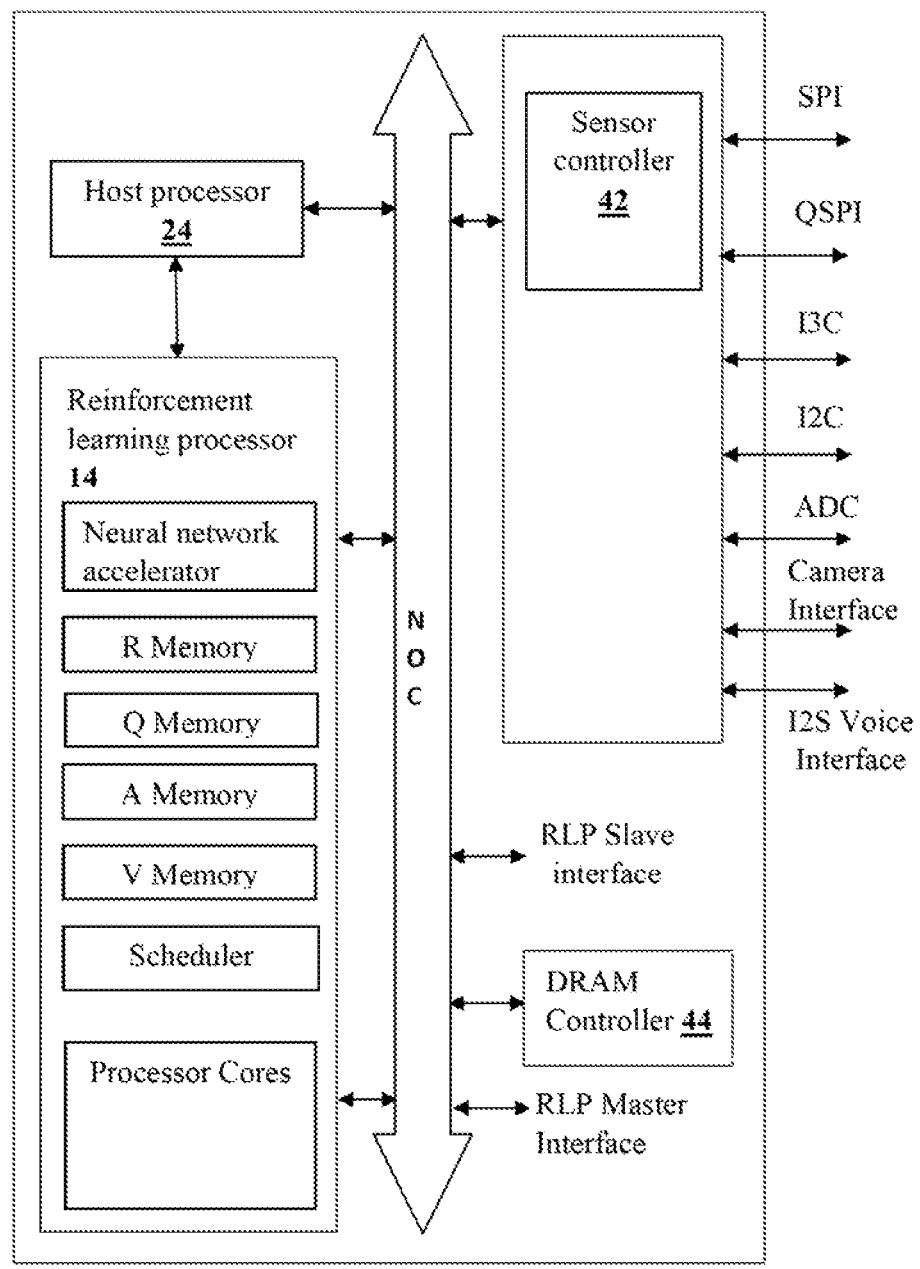
FIG. 4 is a block diagram illustrating the configuration of a System on Chip (SoC) incorporating the reinforcement learning processor, in accordance with the present disclosure.

Referring to FIG. 4, there is shown a schematic representation of the system 100 as a System on Chip (SOC). The SOC architecture as illustrated in FIG. 4 includes a host processor 24, reinforcement learning processor 14, sensor controllers 42, DRAM controller, and first memory module 10 communicably coupled through a Network on Chip (NOC) architecture. The host processor 24 executes a predetermined host application which communicates with the reinforcement learning processor 14 through a mailbox interrupt. The reinforcement learning processor 14 is preferably programmed via a host memory map of the host processor 24. Further, the reinforcement learning processor 14 includes a slave/configuration interface and a master interface. The reinforcement learning processor 14 receives sensory inputs from the sensor controllers. The reinforcement learning processor 14 converts the sensory inputs into rewards via at least one of reward function approximation, supervisory training and exploitation & exploration of reinforcement learning environment. The reinforcement learning processor 14 samples rewards via at least one of on-chip Input/output (I/O), sensor I/Os (for example 12C, 13C, 12S), and sensor specific ADC (analog to digital converter).

In accordance with the present disclosure, the reinforcement learning processor 14 communicates with the host processor 24 communicate through Mailbox interrupts. A Time series database (TSD) stores the time series of mailbox interrupts generated by the host processor 24 and the reinforcement learning processor 14. TSD typically includes arrays of numbers indexed by time. Typically, a mailbox interrupt generated by the host processor 24 (host interrupt) is mapped to a mailbox interrupt generated by the reinforcement learning processor 14. Further, all the mailbox interrupts generated by the reinforcement learning processor 14 are mapped to the mailbox interrupts generated by the host processor 24. Interrupts are either vectored interrupts or nested interrupts. The interrupt messages are generated from a dedicated mailbox implemented via an on-chip S-RAM (static RAM)

The host processor 24 configures the reinforcement learning processor 14 to create reinforcement learning environments and reinforcement learning agents. The host processor 24 is configured to access the memory mapped registers of the reinforcement learning processor 14. The host processor 24 is configured to program the first memory module 10 with the application-specific instruction set (ASI) comprising instructions for implementing predetermined reinforcement learning operations. The host processor 24 further programs the memory mapped registers to configure neural networks, recurrent neural networks and the like. The host processor 24 reads the status of each of the memory mapped registers and the execution contexts stored therein. The reinforcement learning processor 14 is powered, collapsed, clock gated and executed at suitable clock frequencies by the host processor 24.

Figure 5:
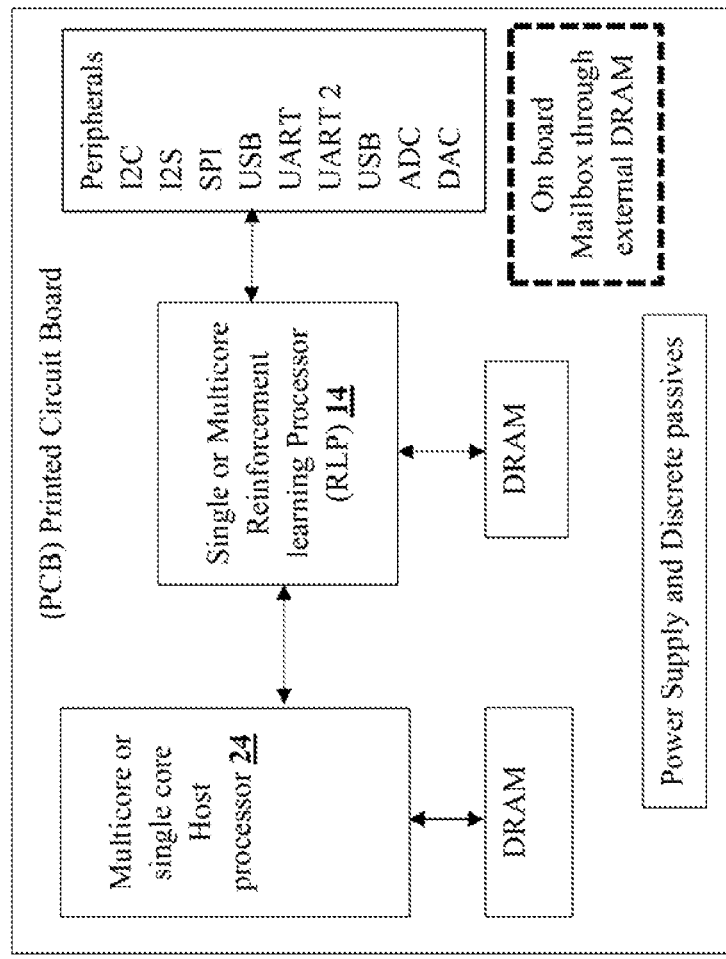
FIG. 5 is a block diagram illustrating the configuration of a Printed Circuit Board (PCB) incorporating the reinforcement learning processor, in accordance with the present disclosure.

Referring to FIG. 5, there is shown a schematic representation of the reinforcement learning processor 14 integrated on a Printed Circuit Board (PCB), in accordance with an exemplary embodiment of the present disclosure. The host processor 24 and the reinforcement learning processor 14 are integrated onto on the printed circuit board (a single Die). The host processor 24 and the reinforcement learning processor 14 interact via a chip to chip connectivity (52). The chip to chip connectivity is mapped to one of a high-speed SERDES serial interface or to GPIOs (General Purpose I/Os). The GPIOs are also mapped to host interrupts (generated byte host processor 24) and RLP interrupts (generated by the reinforcement learning processor).

Referring to FIG. 6A and FIG. 6B in combination, there is shown a flowchart illustrating the steps involved in the computer-implemented method for implementing predetermined reinforcement learning operations. At step 600, a first processor (referred to as host processor hereafter) creates at least one reinforcement learning agent and at least one corresponding reinforcement learning environment. Subsequently, the host processor assigns a reinforcement learning agent ID to the reinforcement learning agent, and a reinforcement learning environment ID to the reinforcement learning environment. At step 602, an application-domain specific instruction set (ASI) comprising instructions for implementing predetermined reinforcement learning operations is created. Further, at step 604, each of the instructions are configured to incorporate at least one of the reinforcement learning agent ID and the reinforcement learning environment ID as an operand.

At step 606, the application-domain specific instruction set comprising instructions for implementing the predetermined reinforcement learning operations is stored in a first memory module. At step 608, at least one of the instructions is selectively fetched by a complex instruction fetch and decode (CISFD) unit. Subsequently, the CISFD unit decodes the instruction and generates a plurality of predetermined threads representative of the decoded instruction. Further at step 608, the plurality of predetermined threads representing the decoded instruction are embedded with at least one of the reinforcement learning agent ID and reinforcement learning environment ID corresponding to the decoded instruction.

At step 610, each of the predetermined threads is processed in parallel by a second processor having multiple processing cores (referred to as reinforcement learning processor hereafter). During the execution of the threads, the instruction corresponding to the threads is applied onto one of the reinforcement learning agent and reinforcement learning environment identified by the reinforcement learning agent ID and reinforcement learning environment ID embedded in the predetermined threads. The reinforcement learning processor is configured to implement the instructions simultaneously on a plurality of reinforcement learning agents and a plurality of reinforcement learning environments. At step 612, based on the execution of the threads, action(s) associated with the reinforcement learning agent at every state thereof, at least one state-value function, at least one Q-value and at least one reward value are determined by the reinforcement learning processor. At step 614, the determined actions, state-value function, Q-value and reward value are stored in predetermined memory partitions of a second memory module.

At step 616, a neural network is triggered via a corresponding neural network data path, and the determined actions, state-value function, Q-value and reward value are transferred to the neural network for analysis. Subsequently, the neural network is trained using the determined actions, state-value function, Q-value and reward value, to approximate a value-function and a reward function corresponding to either a current state or a future state of the reinforcement learning agent. Shown herein below is a table incorporating a non-exhaustive, exemplary list of instructions for performing predetermined reinforcement learning operations.

TABLE 1 list of instructions for implementing reinforcement learning operations

| Instruction | Opcode | Operand | Description |
|---|---|---|---|
| vapproxlin | 00000010 | AgentID | Perform value function approximation on a reinforcement learning agent represented by 'agent ID'. |
| extoptk | 00001010 | AgentID | Trigger a reinforcement learning agent represented by 'agentID' to enter into an exploitation mode |
| optval | 00001100 | AgentID | Optimal value function for current state of MDP of reinforcement learning agent specified by 'agent ID'. |
| explrk | 00001101 | AgentID | Trigger a reinforcement learning agent specified by 'agentID' to enter into an exploration mode. |
| explrall | 00001110 | EnvID | Trigger all the reinforcement learning agents interacting with a reinforcement learning environment represented by 'envID', to enter into exploration mode. |
| vapproxgd | 00001111 | AgentID | Approximate a value function for reinforcement learning agent represented by 'agent ID'. |
| dwnctxk | 00010110 | CoreID | Download learning/inferencing context to a processor core identified by coreID. |
| policygradk | 00011001 | AgentID | Perform Policy gradient on a reinforcement learning agent represented by 'agent ID'. |
| bkpk | 00011010 | AgentID | Perform a 'backup' operation an a reinforcement learning agent represented by 'agent ID'. |
| politerk | 00011101 | AgentID | Perform Policy iteration on a reinforcement learning agent represented by 'agent ID'. |
| fetchq | 00011111 | AgentID | Fetch Q-values for reinforcement learning agent represented by 'agent ID', from Q-memory module. Q-value for the last state of the reinforcement learning agent is fetched, by the way of a stack based access. |
| fetchv | 00100000 | AgentID | Fetch value functions for reinforcement learning agent represented by 'agent ID', from V-memory module. Value function for the last state of the reinforcement learning agent is fetched, by the way of a stack based access. |
| dmar | 00100001 | DMA length (16 bit), DMA start offset (15 bit), direction (1 bit) | Perform a Direct Memory Access (DMA) on the R-memory module. |
| dmaa | 00100010 | DMA length (16 bit), DMA start offset (15 bit), direction (1 bit) | Perform a Direct Memory Access (DMA) on the A-memory module. |
| dmav | 00100111 | DMA length (16 bit), DMA start offset (15 bit), direction (1 bit) | Perform a Direct Memory Access (DMA) on the V-memory module. |
| dmaq | 00101000 | DMA length (16 bit), DMA start offset (15 bit), direction (1 bit) | Perform a Direct Memory Access (DMA) on the Q-memory module. |
| ql | 00101001 | AgentID | Initiate Q learning on a reinforcement learning agent represented by 'agent ID'. |

TABLE 1-continued list of instructions for implementing reinforcement learning operations

| Instruction | Opcode | Operand | Description |
|---|---|---|---|
| gpi | 00101100 | AgentID | Perform a Generic Policy Iteration (GPI) on a reinforcement learning agent represented by 'agent ID'. |
| gpiall | 00101101 | EnvID | Perform a Generic Policy Iteration (GPI) on all reinforcement learning agents interacting with the reinforcement learning environment represented by 'envID'. |
| modelenv | 00101110 | AgentID | Model the reinforcement learning environment for a reinforcement learning agent represented by 'agent ID'. |
| modelenvall | 00101111 | EnvID | Model the reinforcement learning environment represented by 'envID' for interaction with corresponding reinforcement learning agents. |
| fetchr | 00110100 | AgentID | Fetch reward values for reinforcement learning agent represented by 'agent ID', from R-memory module. Reward value for the last state of the reinforcement learning agent is fetched, by the way of a stack based access. |
| optq | 00110101 | AgentID | Determine the optimal Q-value for the current state of MDP of a reinforcement learning agent represented by 'agent ID'. |
| crtenv | 00110110 | EnvID | Create a reinforcement learning environment with a corresponding 'envID'. |
| crtagent | 00110111 | EnvID | Create a reinforcement learning agent in a reinforcement learning environment specified by 'envID', and assign a 'agentID' to the newly created reinforcement learning agent. |
| assocrewardk | 00110111 | AgentID, reward functionID (8 bit) | Associate a reward function with a reinforcement learning agent represented by 'agent ID'. |
| intrctenvk | 00111000 | AgentID, N | Trigger a reinforcement learning agent represented by 'agent ID' to interact with reinforcement learning environment for 'N' times and update the Q, V, A and R memory modules, based on the interaction. |
| rdagentctx | 00111001 | EnvID, AgentID | Read the agent context corresponding to a reinforcement learning agent represented by 'agent ID', and store the agent context into an external memory module. |
| rdenvctx | 00111010 | EnvID | Read the environment context corresponding to a reinforcement learning environment represented by 'envID', and store the environment context into an external memory module. |

The instructions exemplified in 'Table 1' form a pan of the application-domain specific instruction set (ASI) envisaged by the present disclosure.

In accordance with the present disclosure, the Q-values are determined based on the execution of the q-thread. Further, the actions are determined based on the execution of the a-thread. Further, the state-value functions are determined based on the execution of the v-thread. Further, the reward values are determined based on the execution of the r-thread.

In accordance with the present disclosure, the Q-values are generated using a state-action function representative of each state of the reinforcement learning agent, and an action performed by the reinforcement learning agent in the state. Further, the Q-values are stored on the plurality of memory banks (160B, 161B, 162B and 163B) of the q-memory module 16B. Every memory bank of the q-memory module stores a Q-value corresponding to 'one' state-action pair representative of an interaction between the reinforcement learning agent and the reinforcement learning environment. Subsequently, the Q-values are extracted from the respective memory banks, and compared for identification of the highest Q-value amongst the extracted Q-values. Further, the highest Q-value is considered as an optimal Q-value.

In accordance with the present disclosure, the action-values are determined by taking into consideration an action performed by the reinforcement learning agent in a predetermined state, and under a predetermined policy. Further, for determining state-value functions, a value associated with each state of the reinforcement learning agent is determined, and represented as a state-value function. Further, for determining the reward values, the rewards obtained by the reinforcement learning agent for performing a predetermined action in a predetermined state are determined, and represented as reward values.

Referring to FIG. 7A, there is shown a reward function approximator denoted by the reference numeral 32. The reward function approximator 32 receives high-dimension sensory input training data (denoted by reference numeral 34) and reward labels (denoted by reference numeral 36). High dimension sensory input training data typically includes sensory data received from the environment in which the reinforcement learning processor 14 is installed. For example, if the reinforcement learning processor 14 is installed in a Printed Circuit Board (PCB), then the sensory data obtained from the environment described by the PCB includes images, videos, acoustics, audio, speech, temperature, pressure, digitized analog signals and the like. The sensory input training data is considered to be either favorable or non-favorable, and accordingly corresponding reward is calculated. The reward labels typically indicate the nature of the reward associated with the sensory input training data. For example, the rewards associated with the sensory input data could either be positive or negative or neutral (zero). In accordance with the present disclosure, the reward approximator 32 is function configured to be implemented in 'two' predetermined modes, namely, training mode and inference mode. When implemented in training mode, the reward function approximator 32 is trained to approximate a reward function. When implemented in inference mode, the reward function approximator 32 provides rewards 38 to the reinforcement learning processor 14. The reinforcement learning processor 14 stores the rewards thus obtained in the 'r-memory module' 16D.

Referring to FIG. 7B, there is shown an exemplary deep neural network 700 for implementing the reward function approximator described in FIG. 7A. Reference numerals 44 and 46 denote high-dimension sensory input training data and reward labels respectively. Reference numeral 48A represents a connection between high-dimension sensory input training data 44, reward labels 46 and neurons of the input layer 48 of the deep neural network 700. Reference numeral 50 represents the phase of 'feature extraction' from the high-dimension sensory input training data 44 and reward labels 46. Reference numeral 52 represents multiple hidden layers of the deep neural network 700 located in between the input layer 48 and the output layer 54. At the output layer 54, error correction (for the features extracted at the input layer 48) is performed. After the aforementioned process is iteratively executed for a predetermined number of times, the deep neural network 700 is executed in an inference mode to generate rewards that are transmitted to the reinforcement learning processor 14. The reinforcement learning processor 14 stores the rewards thus obtained in the 'r-memory module' 16D.

Under certain circumstances enough data might not be available for training a convolutional neural network or a recursive neural network. In such scenarios, a Generative Adversarial Network (GAN) is utilized for reward function approximation. As shown in FIG. 7C, a GAN is communicably coupled with a first database 56 storing the features of rewards generated thus far (also referred to as 'latent reward space'). A reward signal is generated based on the analysis of the databases 56 storing the features of rewards generated thus far. The reward signal is subsequently fed to a reward generator 58. The reward generator 58 outputs a reward (referred to as 'generated reward' hereafter) that is generated based on the latent, reward space. Subsequently, a discriminator 60 compares the generated reward with 'real rewards' stored in a second database 56A. The discriminator 60 compares the generated rewards with the real rewards, and generates a function representative of an error rate between the generated rewards and real rewards. The error rate thus obtained is fed back to the reward generator 58 for error correction, via a feedback loop (shown in dotted lines in FIG. 7C). The function representing the error rate is iteratively determined until the error rate reduces to a value lesser than a predetermined threshold (the threshold calculated based on error type and error quantity), the training of the GAN is temporarily suspended. Subsequently, the output provided by the GAN is treated as reward signal, and is transmitted to the reinforcement learning processor 14. The reinforcement learning processor 14 stores the rewards represented by the reward signal, in the 'r-memory module' 16D.

In accordance with the present disclosure, a computer readable non-transitory storage medium having computer readable instructions stored for parallelism in reinforcement learning and training reinforcement learning agents. The computer readable instructions when executed by a computer processor, cause the computer processor to perform the following steps:

create at least one reinforcement learning agent and at least one corresponding reinforcement learning environment, and assign a reinforcement learning agent ID to the reinforcement learning agent, and assign a reinforcement learning environment ID to the reinforcement learning environment;

create an application-domain specific instruction set (ASI), the application-domain specific instruction set comprising instructions for implementing the predetermined reinforcement learning operations;

create each of the instructions by incorporating at least one of the reinforcement learning agent ID and the reinforcement learning environment ID therein, as an operand;

configure each of the instructions to be simultaneously implemented on a plurality of reinforcement learning agents and a plurality of reinforcement learning environments;

selectively fetch at least one of the instructions by using a complex instruction fetch and decode (CISFD) unit, and decode the instruction, and generate a plurality of predetermined threads corresponding to decoded instruction;

embed into the predetermined threads, at least one of the reinforcement learning agent ID and reinforcement learning environment ID associated with corresponding instruction;

process each of the predetermined threads in parallel, and apply the corresponding instruction onto at least one of a reinforcement learning agent and reinforcement learning environment identified by the reinforcement learning agent ID and reinforcement learning environment ID embedded in the predetermined threads;

train the reinforcement learning agents using the second processor by executing application-domain specific instruction set (ASI), wherein the application-domain specific instruction set are single instruction multiple agents (SIMA) based instructions.

In accordance with the present disclosure, the computer readable non-transitory storage medium having computer readable instructions, when executed by the computer processor, further cause the computer processor to:

create environment vectors corresponding to the reinforcement learning environment;

create agent vectors corresponding to the plurality of reinforcement learning agents;

associate the plurality of reinforcement learning agents to at least one reinforcement learning environment, wherein the reinforcement learning agents follows a different exploration policies as compared with the reinforcement learning environment;

initiate a training on the reinforcement learning agent represented by the reinforcement learning agent ID by using exploration instruction;

generate a plurality of thread vectors and micro threads by the CISFD in response to initiation of training, wherein the plurality of thread vectors comprises q-thread vector, a-thread vector, v-thread vector, g-thread vector and r thread vector; and map a plurality of reinforcement learning operations to the plurality of thread vectors, wherein each thread vector corresponds to a plurality of reinforcement learning agents;

update a gradient vector corresponding to at least one of an agent actor, and an agent critic; wherein the agent actor corresponds to the q-thread vector and the agent critic corresponds to the v-thread vector;

update an action vector from the agent actor corresponding to the a-thread;

determine a gradient parameter of policy dθ and a gradient parameter of value function dθv vector corresponding to the g-thread vector; and update a policy parameter θ and a parameter of value function θv from determined gradient parameters dθ and dθv in a gradient memory of the second memory module.

FIG. 8A illustrates a programmable CISFD generating thread blocks. In accordance with an embodiment herein, at least one of the instructions is fetched from IRAM by using a complex instruction fetch and decode (CISFD) unit. The opcode decoder decodes the instruction, and forwards the decoded instructions to instruction parser. A plurality of predetermined threads are generated by a thread generator lookup RAM corresponding to decoded instruction. The instruction parser maps the threads generated with decoded instructions to generate a plurality of thread blocks of r, v, q, and g threads. Further, the threads are embedded with one of the reinforcement learning agent ID and reinforcement learning environment ID associated with corresponding instruction. Subsequently, each of the generated threads are executed in parallel.

Figure 9B:
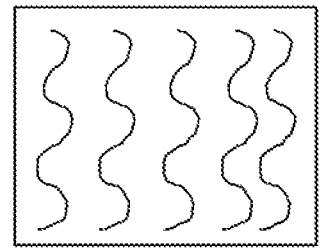
Figure 9C:
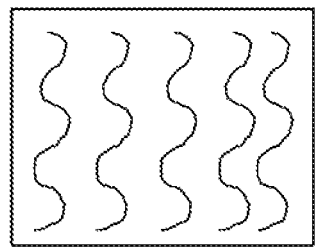
Figure 9D:
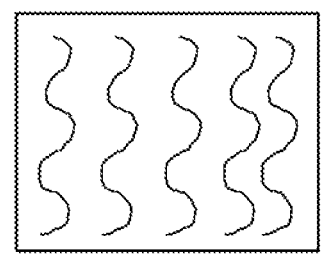
Figure 9E:
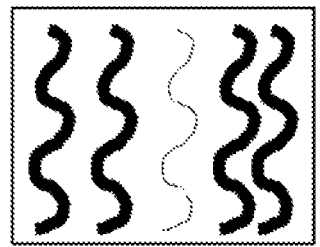

FIG. 9A to 9E illustrates the plurality of threads blocks generated by the CISFD. FIG. 9A illustrates a r-micro thread block. The r-micro thread or reward thread is a light thread, which is responsible for simple read modify write. FIG. 9B illustrates a v-micro thread block. The v-micro thread or value thread is a light thread, which is responsible for simple read modify write. FIG. 9C illustrates a q-micro thread block. The q-micro thread is a light thread, which is simple read modify write. FIG. 9D illustrates a a-micro thread block. The a-micro thread block or a-thread is a light thread, which is simple read modify write. FIG. 9E illustrates a g-micro, thread block. The g-micro thread or general thread includes a major of heavy threads and few light threads for executing complex DSP operations and accessing neural network data path.

FIG. 10A is a block diagram illustrating a training algorithm implemented by the processor architecture for training reinforcement learning agents. In accordance with the disclosure, the processor architecture is configured for parallelism in reinforcement learning operations. The architecture is configured to train reinforcement learning agents using simile instruction multiple agents (SIMA) based instructions to cause a plurality of agents following different policies execute in copies of same environments. Further, the best of all agents is selected and merged in a synchronous or asynchronous manner. Also, the processor architecture is designed to reduce training times by a processor architecture with multi agents and distributed training.

In accordance with the disclosure, the processor is configured to create environment vectors corresponding to the reinforcement learning environment. Further, agent vectors (actors and critics) corresponding to the plurality of reinforcement learning agents are created. The plurality of reinforcement learning agents is associated to at least one reinforcement learning environment. The reinforcement learning agents follows a different exploration policies as compared with the reinforcement learning environment. The processor initiates a training on the reinforcement learning agent represented by the reinforcement learning agent ID by using exploration (exploreall) instruction. The plurality of thread vectors and micro threads are generated by the CISFD in response to initiation of training using exploreall instruction. The plurality of thread vectors comprises q-thread vector, a-thread vector, v-thread vector, g-thread vector and r thread vector. Further, a plurality of reinforcement learning operations is mapped to the plurality of thread vectors, where each thread vector corresponds to a plurality of reinforcement learning agents. The plurality of thread vectors are executed for a predetermined time for each reinforcement learning agent. Thereafter, a gradient vector is updated corresponding to at least one of an agent actor, and an agent critic. The agent actor corresponds to the q-thread vector and the agent critic corresponds to the v-thread vector. An action vector from the agent actor is updated corresponding to the a-thread. Subsequently, a reward vector is obtained from environment corresponding to the r thread vector. The processor determines a gradient parameter of policy dθ and a gradient parameter of value function dθv vector corresponding to the g-thread vector, the gradient parameter of policy dθ and a gradient parameter of value function dθv is further updated. Further, a policy parameter θ and a parameter of value function θv is updated from determined gradient parameters dθ and dθv in a gradient memory of the second memory module.

With respect to FIG. 10A, the training follows Advantage Actor Critic (A3C) Method. In accordance with the A3C method, the plurality of agents including actor-critic agents are mapped into a plurality of threads. Further, the plurality of threads are pipelined to increase the efficiency in energy utilization and over all training time. Further similar threading with lower granularity can be applied to other RL methods like asynchronous n-step Q learning, asynchronous one-step sarsa, TD, TD(λ) and various future RL algorithms which follow frame work of reward, value, Q values, States and policies. In A3C algorithm, each of the operations is mapped into micro threads. The micro threads are highly pipelined and hence increases the throughput of the processor.

In accordance with the disclosure, the thread mapping is implemented to Bayesian learning, Single-step Q learning, Sarsa, n step learning etc.

FIG. 10B illustrates a flowchart depicting a method to implement training of reinforcement learning agents. In accordance with the present disclosure, a method for parallelism in reinforcement learning operations and training reinforcement learning agents include the following steps:

create at least one reinforcement learning agent and at least one corresponding reinforcement learning environment, and assign a reinforcement learning agent ID to said reinforcement learning agent, and assign a reinforcement learning environment ID to said reinforcement learning environment;

create an application-domain specific instruction set (ASI), said application-domain specific instruction set comprising instructions for implementing said predetermined reinforcement learning operations;

create each of said instructions by incorporating at least one of said reinforcement learning agent ID and said reinforcement learning environment ID therein as an operand;

configure each of said instructions to be simultaneously implemented on a plurality of reinforcement learning agents and a plurality of reinforcement learning environments;

selectively fetch at least one of said instructions by using a complex instruction fetch and decode (CISFD) unit, and decode said instruction, and generate a plurality of predetermined threads corresponding to decoded instruction;

embed into the predetermined threads, at least one of said reinforcement learning agent ID and reinforcement learning environment ID associated with corresponding instruction;

process each of said predetermined threads in parallel, and apply the corresponding instruction onto at least one of a reinforcement learning agent and reinforcement learning environment identified by the reinforcement learning agent ID and reinforcement learning environment ID embedded in said predetermined threads;

train the reinforcement learning agents using the second processor by executing application-domain specific instruction set (ASI), wherein the application-domain specific instruction set are single instruction multiple agents (SIMA) based instructions.

In accordance with the present disclosure, the reinforcement learning agents are trained using the second processor by executing application-domain specific instruction set (ASI), wherein the application-domain specific instruction set are single instruction multiple agents (SIMA) based instructions (1100). The method of training reinforcement learning agents includes the step of creating environment vectors corresponding to the reinforcement learning environment (1102). Further, agent vectors (actors and critics) corresponding to the plurality of reinforcement learning agents are created (1104). The plurality of reinforcement learning agents is associated to at least one reinforcement learning environment (1106). The reinforcement learning agents follows different exploration policies as compared with the reinforcement learning environment. The processor initiates a training on the reinforcement learning agent represented by the reinforcement learning agent ID by using exploration (exploreall) instruction. The plurality of thread vectors and micro threads are generated by the CISFD in response to initiation of training using exploreall instruction (1108). The plurality of thread vectors comprises q-thread vector, a-thread vector, v-thread vector, g-thread vector and r thread vector. Further, a plurality of reinforcement learning operations is mapped to the plurality of thread vectors, and wherein each thread vector corresponds to a plurality of reinforcement learning agents (1110). The plurality of thread vectors are executed for a predetermined time for each reinforcement learning agent (1112). Thereafter, a gradient vector is updated corresponding to at least one of an agent actor, and an agent critic (1114). The agent actor corresponds to the q-thread vector and the agent critic corresponds to the v-thread vector. An action vector from the agent actor is updated corresponding to the a-thread. Subsequently, a reward vector is obtained from environment corresponding to the r thread vector. The processor determines a gradient parameter of policy $d\theta$ and a gradient parameter of value function $d\theta v$ vector corresponding to the g-thread vector, the gradient parameter of policy $d\theta$ and a gradient parameter of value function $d\theta v$ is further updated. Further, a policy parameter $\theta$ and a parameter of value function $\theta v$ is updated from determined gradient parameters $d\theta$ and $d\theta v$ in a gradient memory of the second memory module (1116).

The technical advantages envisaged by the present disclosure include the realization of a processor architecture that enables extraction and collection of rich actionable data best suited for reinforcement learning operations. Further, the present disclosure envisages an of alternative to general purpose processor architecture such as Single Instruction Multiple Data (SIMD) and Single Instruction Multiple threads (SIMT). The processor architecture envisaged by the present disclosure is tailor made for effective and efficient implementation of reinforcement learning tasks/operations. The present disclosure also envisages an application domain specific instruction set designed for executing tasks/operations pertinent to reinforcement learning. The application domain specific instruction set is simultaneously executed across multiple reinforcement learning agents and reinforcement learning environments (Single Instruction Multiple Agents (SIMA)). Further, the application domain specific instruction set is capable of performing value function approximation and reward function approximation, by the way of training a neural network. The application domain specific instruction set and the processor architecture provide for an effective balance to be maintained between exploration and exploitation activities of a reinforcement learning environment. Further, the present disclosure provides an effective solution to the 'curse of dimensionality' typically witnessed in high-dimensional data analysis scenarios. The application domain specific instruction set and the processor architecture envisaged by the present disclosure enable parallel learning and effective sharing of learning, amongst a plurality of reinforcement learning agents. The processor architecture envisaged by the present disclosure necessitates fewer clock cycles in comparison to the conventional CPU/GPU, to implement reinforcement learning operations/tasks. Further, the application domain specific instruction set and the processor architecture envisaged by the present disclosure render comparatively larger levels of abstraction, during the implementation of reinforcement learning operations/tasks. The processor architecture of the present disclosure comparatively decrease the time required to train all RL agents.

The processor architecture incorporating instruction set based on Single Instruction Multiple Agents (SIMA) is specifically designed for executing tasks/operations pertinent to reinforcement learning in parallel. A processor architecture designed for parallelism in reinforcement learning operations is provided. The processor architecture is designed to reduce training times by a processor architecture with multi agents and distributed training An application domain specific instruction set is provided and a processor architecture is optimized for training the reinforcement learning agents.

An autonomous systems and server based applications is developed to provide the multiple agents as operand to the SIMA instructions, for speeding up training in the applications like gaming.

A training system for AI systems using SIMA (Single Instruction Multiple Agents) ISA based processor, is provided to support both the reply memory and as well as parallel actor-critic agents, thereby supporting a number of on policy learning methods.

A training system for AI systems is developed to provide each agent with different r, v, q, g and a threads, thereby providing separate thread for each one of reinforcement learning operations, to effectively pipeline a number of parallel agents, to decrease training time by order of magnitude compared to Advantage Actor Critic (A3C) algorithm where entire agent is mapped to a single thread.

A training system for AI systems is provided to enable multiple agents to explore different part of the environment thereby using lesser resource than single DQN, and reducing communication overhead.

A training system for AI systems is provided to use fine grain threads of RL compared to single thread on entire agent, to enable supporting large number of agents in a hierarchical task.

A training system for AI systems using SIMA is developed to provide same instructions to multiple agents to reduce code density and create highly pipelined operations with large parallelism in training.

A training system for AI systems, is provided to group similar of different agents into one thread blocks of operations with SIMA instructions.

A training system for AI systems is provided to create the agents (actor plus critic) and map the threads, instead of mapping entire of algorithm into single thread.

A training system for AI systems, is provided to map each of the operations into a micro thread and to pipeline these micro threads, instead of mapping entire agent into a single thread, thereby increasing the throughput of the processor.

A training system is provided for performing thread mapping to Bayesian learning, Single-step Q learning, Sarsa, n step Q learning etc.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer-implemented system for training artificial intelligence based systems, the system comprising:
    a first processor configured to create at least one reinforcement learning agent and at least one corresponding reinforcement learning environment, the first processor further configured to assign a reinforcement learning agent ID to the reinforcement learning agent, and a reinforcement learning environment ID to the reinforcement learning environment, and wherein the first processor is configured to create an application-domain specific instruction set (ASI), and wherein the application-domain specific instruction set (ASI) comprises instructions for implementing the predetermined reinforcement learning operations, and wherein each of the instructions incorporate at least one of the reinforcement learning agent ID and the reinforcement learning environment ID as an operand;
    a first memory module communicably coupled to the first processor, the first memory module configured to store an application-domain specific instruction set (ASI);
    a complex instruction fetch and decode (CISFD) unit communicably coupled to the memory module, and wherein the CISFD unit configured to selectively fetch at least one of the instructions and decode at least one of the instructions, and generate a plurality of predetermined threads corresponding to decoded instruction, and wherein the CISFD unit still further configured to embed into the predetermined threads, at least one of the reinforcement learning agent ID and reinforcement learning environment ID associated with the decoded instruction;
    a second processor configured to execute the predetermined reinforcement learning operations, the second processor comprising a plurality of cores, the second processor configured to process each of the predetermined threads in parallel using the plurality of cores, and apply a corresponding instruction onto at least one of a reinforcement learning agent and reinforcement learning environment identified by the reinforcement learning agent ID and reinforcement learning environment ID embedded in the predetermined threads;
    a second memory module cooperating with the second processor, wherein the second memory module is a gradient memory, and wherein a plurality of gradients in the gradient memory is updated from each one of a plurality of agents working in parallel; and
    wherein the second processor is further configured to train the reinforcement learning agents using application-domain specific instruction set (ASI), wherein the application-domain specific instruction set are single instruction agents (SIMA) based instructions, and wherein a plurality of agents are configured to work on a copy of same environment and work on mutually different policies in parallel, and wherein the plurality of agents is selected and merged in a synchronous or asynchronous manner;
    wherein the second processor is configured to:
    create environment vectors corresponding to the reinforcement learning environment;
    create agent vectors corresponding to the plurality of reinforcement learning agents;
    associate the plurality of reinforcement learning agents to at least one reinforcement learning environment, wherein the reinforcement learning agents follows a different exploration policies as compared with the reinforcement learning environment;
    initiate a training on the reinforcement learning agent represented by the reinforcement learning agent ID by using exploration instruction;
    generate a plurality of thread vectors and micro threads by the CISFD in response to initiation of training, wherein the plurality of thread vectors comprises q-thread vector, a-thread vector, v-thread vector, g-thread vector and r thread vector, and wherein each operation is mapped into micro thread;
    map a plurality of reinforcement learning operations to the plurality of thread vectors, and wherein each thread vector corresponds to a plurality of reinforcement learning agents;
    update a gradient vector corresponding to at least one of an agent actor, and an agent critic; wherein the agent actor corresponds to the q-thread vector and the agent critic corresponds to the v-thread vector;
    update an action vector from the agent actor corresponding to the a-thread;
    determine a gradient parameter of policy $d\theta v$ vector corresponding to the g-thread vector;

update a policy parameter θ and a parameter of value function θv from determined gradient parameters dθ and dθv in a gradient memory of the second memory module; and wherein the plurality of thread vectors generated by the CISFD are indicative of the interaction between the reinforcement learning agent and the reinforcement learning environment, the plurality of thread vectors are executed for a predetermined time for each reinforcement learning agent.

2. The system, as claimed in claim 1, wherein the second processor is further configured to:

trigger the reinforcement learning agent to interact with the reinforcement learning environment and enable the reinforcement learning agent to:

explore the reinforcement learning environment to deduce relevant learning therefrom; and apply deduced relevant learning onto the reinforcement learning environment;

trigger the reinforcement learning agent to exploit gathered learnings by further interacting with the reinforcement learning environment;

construct at least one of a Markov Decision Process (MDP) and Semi-Markov Decision Process (SMDP) based on an interaction between the reinforcement learning agent and the reinforcement learning environment; selectively update the MDP and SMDP, based on learning achieved from, the interaction between the reinforcement learning agent and the reinforcement learning environment;

selectively create a backup of the MDP representative of the interaction between the reinforcement learning agent and the reinforcement learning environment;

initiate a q-learning procedure on the reinforcement learning agent; associate a reward function with the reinforcement learning agent;

enable the reinforcement learning agent to interact with the reinforcement learning environment for a predetermined time period;

read a context corresponding to the reinforcement learning agent, and read the context corresponding to the reinforcement learning environment, and store the read context;

initiate a predetermined deep-learning operation on the reinforcement learning agent;

determine the optimal Q-value corresponding to a current state of the reinforcement learning agent;

implement generalized policy iteration (GPI);

implement on-policy and off-policy learning methods on the reinforcement learning agent;

approximate a state-value function for the current state of the reinforcement learning agent, and determined an optimal state-value function for the current state of the reinforcement learning agent; and fetch Q-values, state-value functions and reward values corresponding to the reinforcement learning agent, from the corresponding memory partitions of the second memory module.

3. The system, as claimed in claim 1, wherein the second processor is further configured to:

feed training data into the neural network through the neural network data path, and initiate training of the neural network;

download weights corresponding to the neural network;

communicate with a predetermined deep neural network;

selectively clear the weights assigned to the neural network;

perform value-function approximation using the deep neural network, for the reinforcement learning agent represented by the reinforcement learning agent ID; and train the deep neural network using a predetermined learning context.

4. The system as claimed in claim 1, wherein:

the instructions are configured to be simultaneously implemented on a plurality of reinforcement learning agents and a plurality of reinforcement learning environments; and wherein the CISFD unit is further configured to create the predetermined threads corresponding to each of the plurality of reinforcement learning environments, the CISFD unit still further configured to group the predetermined threads into a thread block.

5. The system as claimed in claim 1, wherein:

the second memory module is partitioned into a gradient memory to store Global parameters θ, θv obtaining from the training.

6. A method for training artificial intelligence based systems, the method comprising following computer-implemented steps:

creating at least one reinforcement learning agent and at least one corresponding reinforcement learning environment using a first processor, and assigning a reinforcement learning agent ID to the reinforcement learning agent, and assigning a reinforcement learning environment ID to the reinforcement learning environment;

creating an application-domain specific instruction set (ASI), the application-domain specific instruction set comprising instructions for implementing the predetermined reinforcement learning operations;

creating each of the instructions by incorporating at least one of the reinforcement learning agent ID and the reinforcement learning environment ID therein, as an operand;

storing the application-domain specific instruction set in a first memory module;

selectively fetching at least one of the instructions, using a complex instruction fetch and decode (CISFD) unit, and decoding the instruction, and generating a plurality of predetermined threads corresponding to decoded instruction;

embedding into the predetermined threads, at least one of the reinforcement learning agent ID and reinforcement learning environment ID associated with the decoded instruction;

executing each of the predetermined threads in parallel using a second processor, and applying the corresponding the corresponding instruction onto at least of a reinforcement learning agent and reinforcement learning environment identified respectively by the reinforcement learning agent ID and reinforcement learning environment ID embedded in the predetermined threads;

training the reinforcement learning agents using the second processor by executing application-domain specific instruction set (ASI), wherein the application-domain specific instruction set are single instruction multiple agents (SIMA) based instructions.

7. The method as claimed in claim 6, wherein the step of creating an application-domain specific instruction set (ASI), further includes the step of incorporating into the ASI, the instructions for:

creating environment vectors corresponding to the reinforcement learning environment;

creating agent vectors corresponding to the plurality of reinforcement learning agents;
associating the plurality of reinforcement learning agents to at least one reinforcement learning environment, wherein the reinforcement learning agents follows a different exploration policies as compared with the reinforcement learning environment;
initiating a training, wherein the plurality of thread vectors comprises q-thread vector, a-thread vector, v-thread vector, g-thread vector and r thread vector; and
mapping a plurality of reinforcement learning operations to the plurality of thread vectors, wherein each thread vector corresponds to a plurality of reinforcement learning agents;
updating a gradient vector corresponding to at least one of an agent actor, and, an agent critic; wherein the agent actor corresponds to the q-thread vector and the agent critic corresponds to the v-thread vector;
updating an action vector from the agent actor corresponding to the a-thread;
determining gradient parameter of policy dθ and gradient parameter of value function dθv vector corresponding to the g-thread vector; and
updating policy parameter θ and parameter of value function θv from determined gradient parameters dθ and dθv in a gradient memory of the second memory module.

8. The method as claimed in claim 6, wherein:
the plurality of thread vectors generated by the CISFD are indicative of the interaction between the reinforcement leaning agent and the reinforcement learning environment, the plurality of thread vectors are executed for a predetermined time for each reinforcement learning agent.

9. The method as claimed in claim 6, wherein the step of creating an application-domain specific instruction set (ASI), further includes the step of incorporating into the ASI, the instructions for:
triggering the reinforcement learning agent to interact with the reinforcement learning environment and enabling the reinforcement learning agent to:
explore the reinforcement learning environment to deduce relevant learning therefrom; and
apply deduced relevant learning onto the reinforcement learning environment;
triggering the reinforcement learning agent to exploit gathered learning by father interacting with the reinforcement learning environment;
constructing at least one of a Markov Decision Process (MDP) and Semi-Markov Decision Process (SMDP) based on interaction between the reinforcement learning agent and the reinforcement learning environment;
selectively updating the MDP and SMDP, based on learning achieved from the interaction between the reinforcement learning agent and the reinforcement learning environment;
selectively creating a backup of the MDP representative of the interaction between the reinforcement learning agent and the reinforcement learning environment;
initiating a q-learning procedure on the reinforcement learning agent;
associating a reward function with the reinforcement learning agent;
performing generalized policy iteration (GPI);
implementing on-policy and off-policy learning methods on the reinforcement learning agent;
enabling the reinforcement learning agent to interact with the reinforcement learning environment for a predetermined time period;
reading a context corresponding to the reinforcement to the reinforcement learning agent, and reading the context corresponding to the reinforcement learning environment, and storing the read context;
initiating a predetermined deep-learning operation on the reinforcement learning agent represented by the reinforcement learning agent ID;
determining the optimal Q-value corresponding to a current state of the reinforcement learning agent;
fetching the Q-values, state-value functions, actions and reward values corresponding to the reinforcement learning, from the corresponding memory partitions of the second memory module; and
approximating a state-value function for the current state of the reinforcement learning agent, and determining an optimal state-value function for the current state of the reinforcement learning agent.

10. The method as claimed in claim 6, wherein the step of executing each of the predetermined threads in parallel using a second processor, and applying the corresponding instruction onto at least one of a reinforcement learning agent and reinforcement learning environment identified respectively by the reinforcement learning agent ID and reinforcement learning environment ID embedded in the predetermine threads, and determining an action, a state-value function, a Q-value and a reward value, based on execution of the instruction corresponding to the predetermined threads, further includes the following steps:
determining the Q-values based on the execution of a q-thread;
determining actions to be performed by the reinforcement learning processor, based on the execution of an-thread;
determining the state-value functions based on the execution of a v-thread; and
determining the reward values based on execution of an r-thread.

11. The method as claimed in claim 6, wherein the step of determining an action based on the execution of an a-thread, further includes the step of determining the action performed by the reinforcement learning agent in a predetermined state, and under a predetermined policy.

12. The method as claimed in claim 6, wherein the step of determining the state-value functions based on the execution of a v-thread, further includes the step of determining a value associated with the each state of the reinforcement learning agent, and representing the value as a state-value function.

13. The method as claimed in claim 6, wherein the step of determining the reward values based on the execution of an-r-thread, further includes the step of determining rewards obtained by the reinforcement learning agent for performing a predetermined action in a predetermined state, within the reinforcement learning environment, and storing the rewards as reward values.

14. A computer readable non-transitory storage medium stored with computer readable instructions and expected by a computer processor, to cause the computer processor to:
create at least one reinforcement learning agent and at least one corresponding reinforcement learning environment using a first processor, and assign a reinforcement learning agent ID to the reinforcement learning agent, and assign a reinforcement learning environment;

create an application-domain specific instruction set (ASI), the application-domain specific instruction set comprising instructions for implementing the predetermined reinforcement learning operations;

create each of the instructions by incorporating at least one of the reinforcement learning agent ID and the reinforcement learning environment ID therein, as an operand;

storing the application-domain specific instruction set in a first memory module;

configure each of the instructions to be simultaneously implemented on a plurality of reinforcement learning agents and a plurality of reinforcement learning environments;

selectively fetch at least one of the instructions by using a complex instruction fetch and decode (CISFD) unit, and decode the instruction, and generate a plurality of predetermined threads corresponding to decoded instruction;

embed into the plurality of decoded predetermined threads, at least one of the reinforcement learning agent ID and reinforcement learning environment ID associated with corresponding decoded instruction;

execute each of the predetermined threads in parallel using a second processor, and apply the corresponding instruction onto at least one of a reinforcement learning agent and reinforcement learning environment identified by the reinforcement learning agent ID and reinforcement learning environment ID embedded in the predetermined threads;

train the reinforcement learning agents using the second processor by executing application-domain specific instruction set (ASI), wherein the application-domain specific instruction set are single instruction multiple agents (SIMA) based instructions.

15. The computer readable non-transitory storage medium as claimed in claim 14, wherein the computer readable instructions, when executed by the computer processor, further cause the computer to:

create environment vectors corresponding to the reinforcement learning environment;

create agent vectors corresponding to the plurality of reinforcement learning agents;

associate the plurality of reinforcement learning agents to at least one reinforcement learning environment, wherein the reinforcement learning agents follows a different exploration policies as compared with the reinforcement learning environment;

initiate a training on the reinforcement learning agent represented by the reinforcement learning agent ID by using exploration instruction;

generate a plurality of thread vectors and micro threads by the CISFD in response to initiation of training, wherein the plurality of thread vectors comprises q-thread vector, a-thread vector, v-thread vector, g-thread vector and r thread vector; and map a plurality of reinforcement learning operations to the plurality of thread vectors, wherein each thread vector corresponds to a plurality of reinforcement learning agents;

update a gradient vector corresponding to at least one of an agent actor, and an agent critic; wherein the agent actor corresponds to the q-thread vector and the agent critic corresponds to the v-thread vector;

update an action vector from the agent actor corresponding to the a-thread;

determine a gradient parameter of policy $d\theta$ and a gradient parameter of value function $d\theta v$ vector corresponding to the g-thread vector; and update a policy parameter $\theta$ and a parameter of value function $\theta v$ from determined gradient parameters $d\theta$ and $d\theta v$ in a gradient memory of the second memory module.

16. The computer readable non-transitory storage medium as claimed in claim 14, wherein the plurality of thread vectors generated by the CISFD are indicative of the interaction between the reinforcement learning agent and the reinforcement learning environment, the plurality of thread vectors are executed for a predetermine time for each reinforcement learning agent.

* * * * *